US009509629B2

(12) United States Patent
Iikura et al.

(10) Patent No.: US 9,509,629 B2
(45) Date of Patent: Nov. 29, 2016

(54) OPERATION ENVIRONMENT MIGRATION SUPPORT DEVICE, RECORD MEDIUM WITH PROGRAM STORED THEREFOR, AND METHOD THEREFOR

(71) Applicant: FUJITSU LIMITED, Kawasaki-shi, Kanagawa (JP)

(72) Inventors: Fumi Iikura, Shinagawa (JP); Yasuhide Matsumoto, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 310 days.

(21) Appl. No.: 14/186,105

(22) Filed: Feb. 21, 2014

(65) Prior Publication Data

US 2014/0297871 A1 Oct. 2, 2014

(30) Foreign Application Priority Data

Mar. 26, 2013 (JP) ................................ 2013-064828

(51) Int. Cl.
*H04L 12/911* (2013.01)
*G06F 9/455* (2006.01)
*H04L 12/803* (2013.01)

(52) U.S. Cl.
CPC ......... *H04L 47/783* (2013.01); *G06F 9/45558* (2013.01); *H04L 47/125* (2013.01); *G06F 2009/4557* (2013.01)

(58) Field of Classification Search
CPC ............................ H04L 12/911; H04L 47/783
USPC .......................................................... 709/226
See application file for complete search history.

(56) References Cited

U.S. PATENT DOCUMENTS

2012/0324445 A1* 12/2012 Dow .................. G06F 9/45504 718/1
2014/0082612 A1* 3/2014 Breitgand .......... G06F 9/45533 718/1
2014/0229933 A1* 8/2014 Kanungo ........... G06F 9/45558 718/1

FOREIGN PATENT DOCUMENTS

JP 2011-150563 8/2011

* cited by examiner

*Primary Examiner* — Patrice Winder
*Assistant Examiner* — Zia Khurshid
(74) *Attorney, Agent, or Firm* — Fujitsu Patent Center

(57) ABSTRACT

An operation environment migration support device obtains, from first and second physical server devices, element information on an element of a virtual resource, obtains subdivided element information which is information on a subdivided element indicative of an element which constructs the element indicated by the element information, determines whether or not types of a communication network and information on the virtual machine which belongs to the communication network match up respectively, determines that a performance of a subdivided element indicated by subdivided element information obtained from the second physical server device exceeds a performance of a subdivided element indicated by element information obtained from the first physical server device, and outputs information which indicates that an operation environment for the virtual machine of the first physical server device is migratable to the second physical server device.

7 Claims, 33 Drawing Sheets

28

| MEANING | PARAMETER | STANDARD API |
|---|---|---|
| | $USERID USER ID<br>$VSYSID ID OF EXTENDED IAAS MANAGEMENT TARGET OF PROVIDER | |
| SEE VIRTUAL MACHINE INFORMATION | $VSERVERID VIRTUAL MACHINE ID | http://api.providera.com/cimi/$USERID/systems/$VSYSID/machines/$VSERVERID |
| SEE VOLUME INFORMATION | $VOLUMEID VOLUME ID | http://api.providera.com/cimi/$USERID/systems/$VSYSID/volumes/$VOLUMEID |
| SEE NETWORK INFORMATION | $NETID NETWORK ID | http://api.providera.com/cimi/$USERID/systems/$VSYSID/networks/$NETID |
| ... | ... | ... |

F I G. 4

30

| 71 NETWORK OF MIGRATION SOURCE PROVIDER | 72 NETWORK OF MIGRATION DESTINATION CANDIDATE PROVIDER |
|---|---|
| ... | ... |

FIG. 6

```xml
<systemTemplate>
  <id>http:// api.providera.com/6896/systemTemplates/SYSTMP00001</id>
  <name>TwoTierSkelton</name>
  <networkTemplates>
    <networkTemplate>
      <name>mypublicnetwork</name>
      <type>public</type>
    </networkTemplate>
    <networkTemplate>
      <name>myprivatenetwork</name>
      <type>private</type>
    </networkTemplate>
  </networkTemplates>
  <machineTemplates>
    <machineTemplate>
      <name>app server</name>
      <machineImage href=http://api.providera.com/6896/images/IMG00001>
      <machineConfiguration>
        <cpu>1</cpu>
        <memory>5000000</memory>
        <disks>
          <disk>
            <capacity>5000000000</capacity>
          </disk>
        </disks>
      </machineConfiguration>
      <network>mypublicnetwork</network>
    </machineTemplate>
    <machineTemplate>
      <name>db server</name>
      <machineImage href=http://api.providera.com/6896/images/IMG00002>
      <machineConfiguration>
        <cpu>1</cpu>
        <memory>5000000</memory>
        <disks>
          <disk>
            <capacity>5000000000</capacity>
          </disk>
        </disks>
      </machineConfiguration>
      <network>myprivatenetwork</network>
      <volumeTemplate>
        <volumeConfiguration>
          <capacity>5000000000</capacity>
        </volumeConfiguration>
      </volumeTemplate>
    </machineTemplate>
  </machineTemplates>
</systemTemplate>
```

FIG. 7

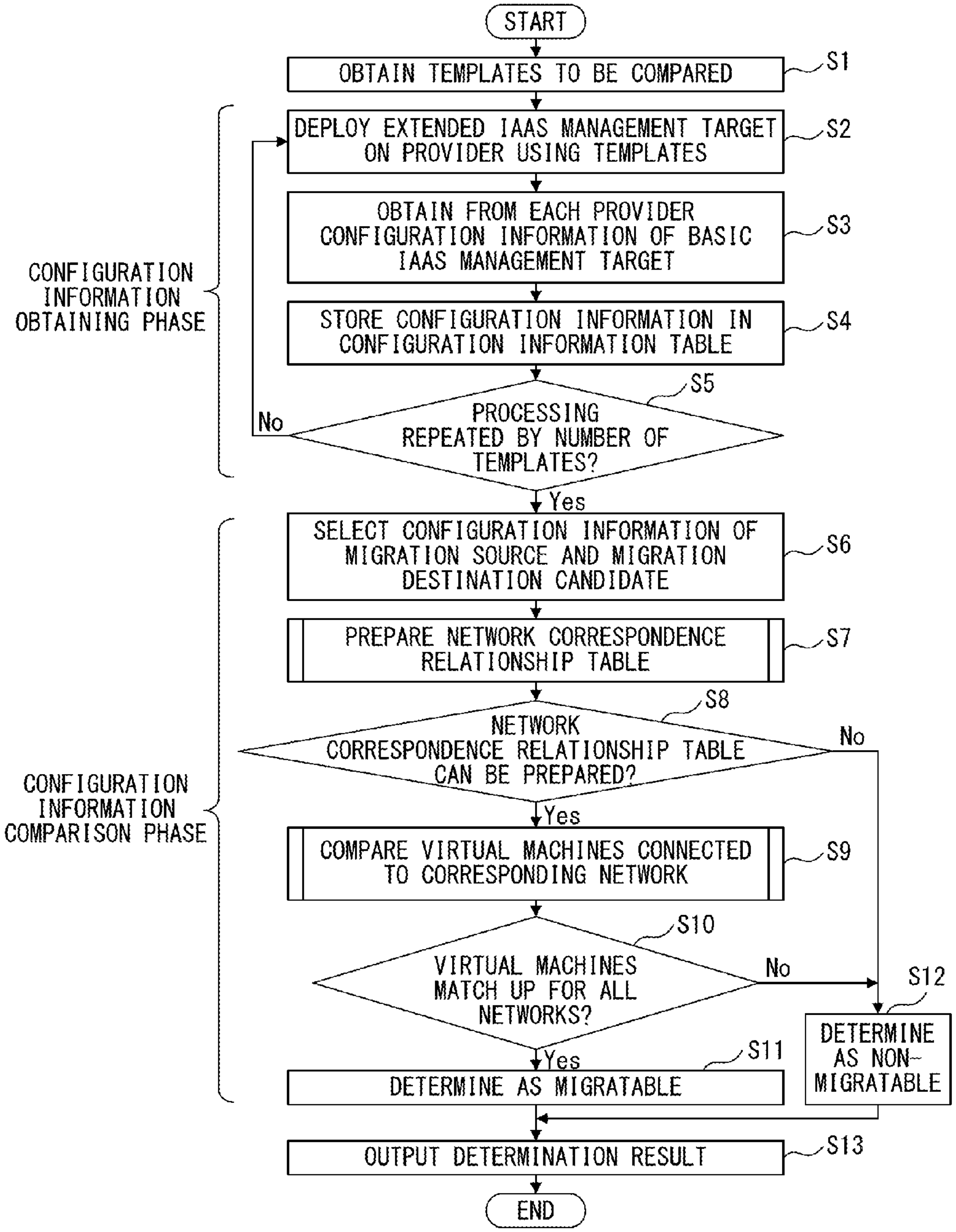
F I G. 8

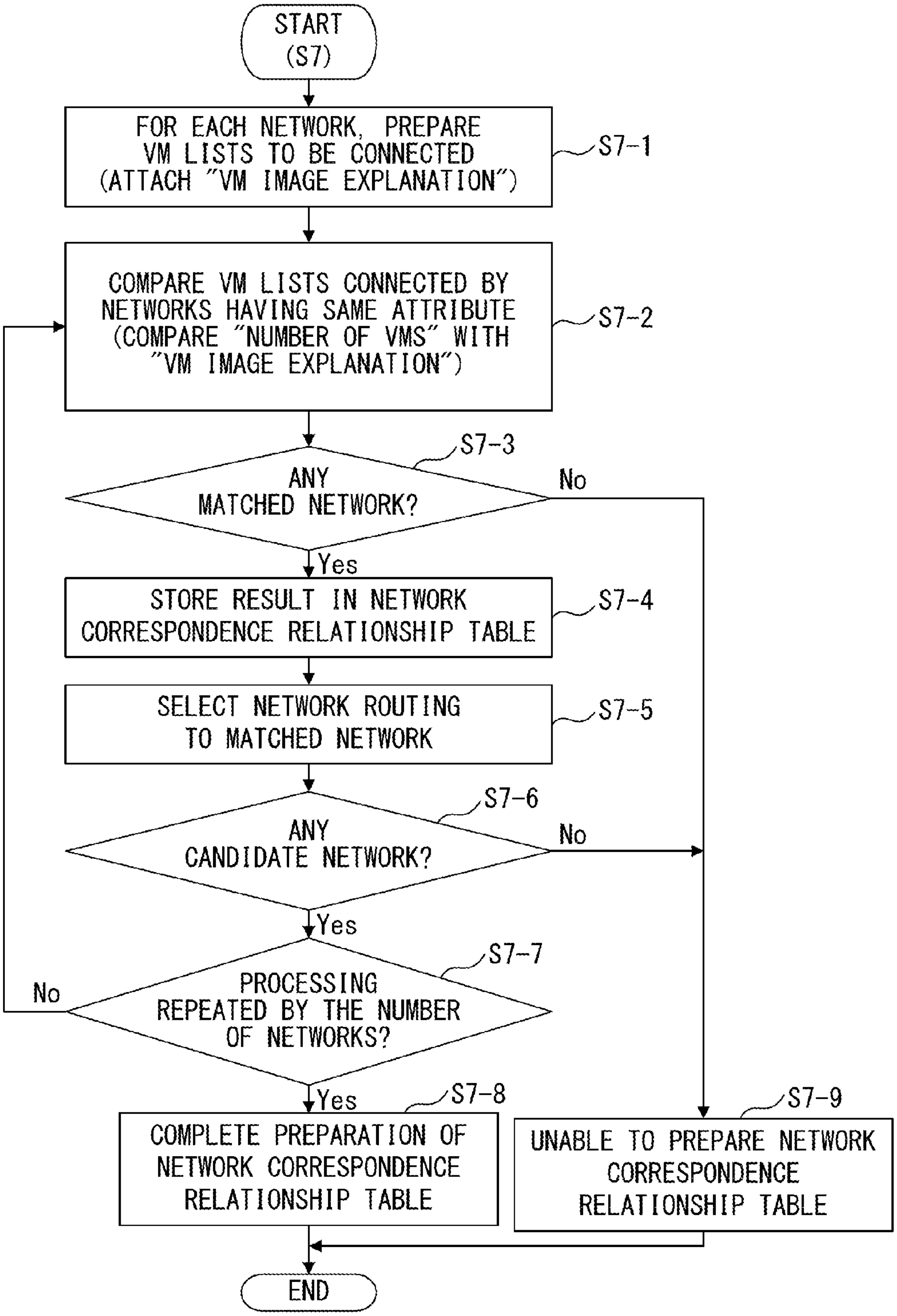
F I G. 9

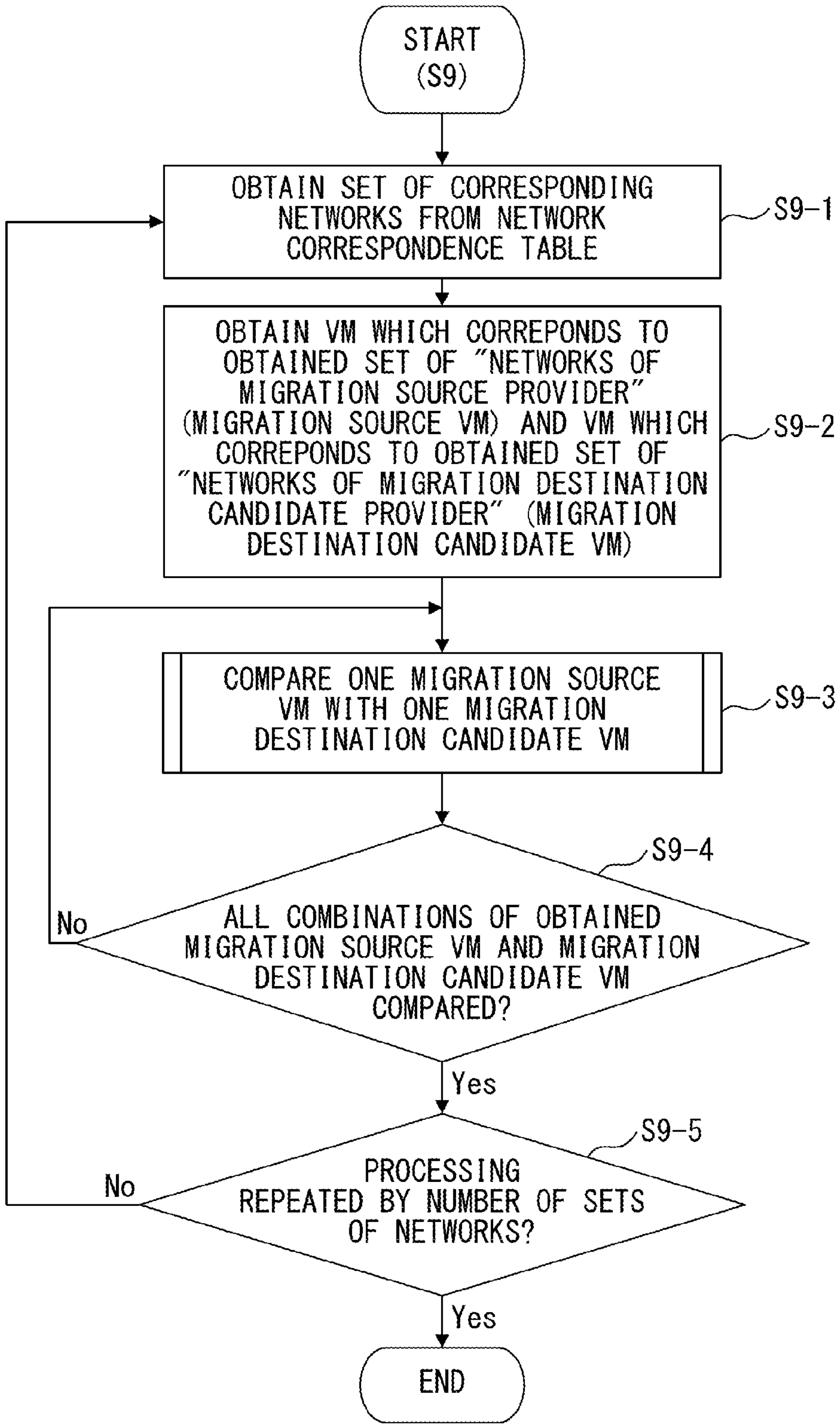
F I G. 10

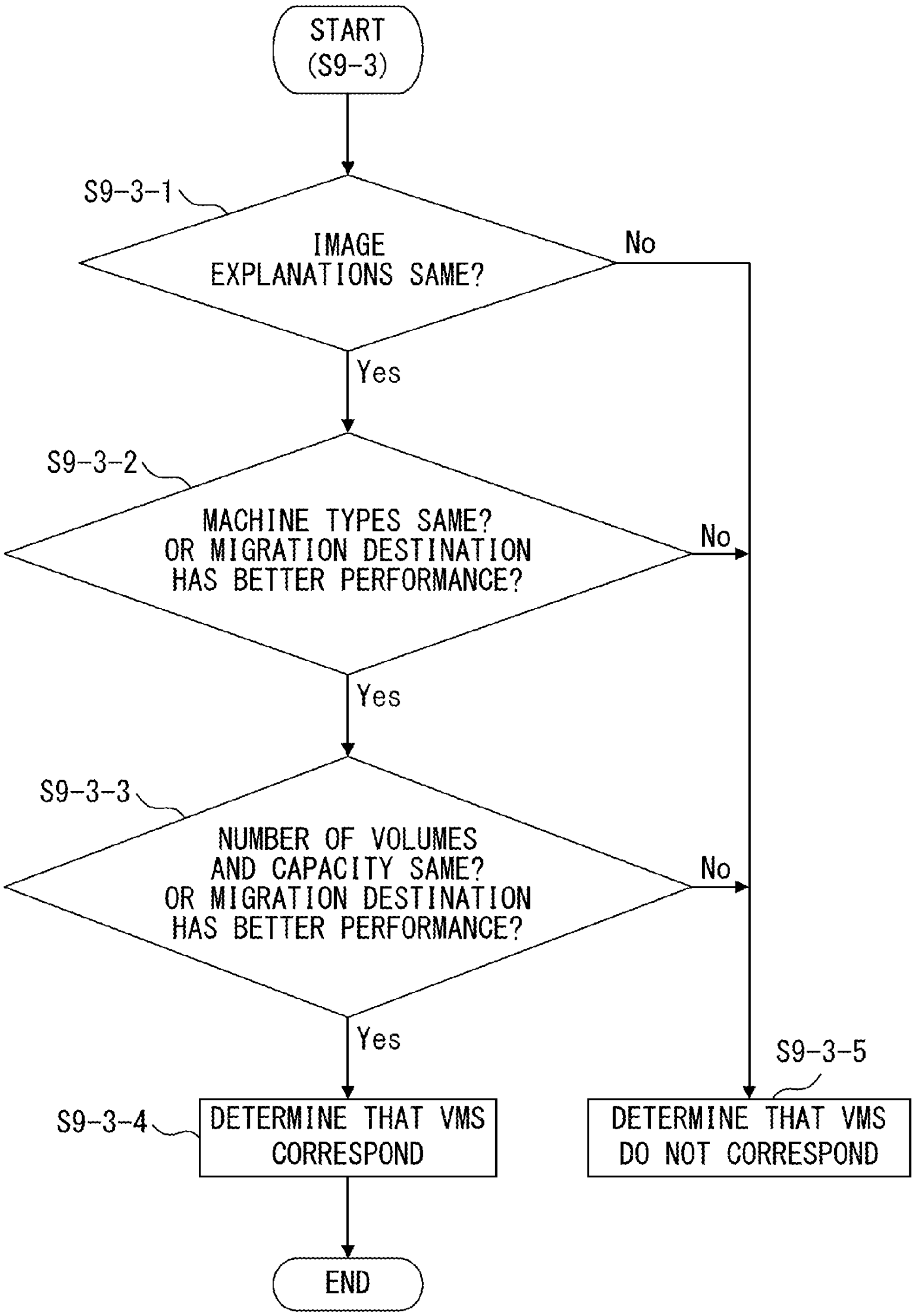
F I G. 11

```
http://api.providera.com/6896/
?Action=GetVSYSConfiguration&vsysId=VSYS00001
```

```
<vsys>
  <vsysId>VSYS00001</vsysId>
  <vsysName>Test System</vsysName>
  <vnets>
    <vnet>
      <networkId>NET00001</networkId>
    </vnet>
    <vnet>
      <networkId>NET00002</networkId>
    </vnet>
  </vnets>
  <vservers>
    <vserver>
      <vserverId>VSERVER00001</vserverId>
    </vserver>
    <vserver>
      <vserverId>VSERVER00002</vserverId>
    </vserver>
  </vservers>
  <vdisks>
    <vdisk>
      <vdiskId>VDISK00001</vdiskId>
    </vdisk>
  </vdisks>
</vsys>
```

VIRTUAL MACHINE INFORMATION

| MACHINE ID | IMAGE ID | VM IMAGE EXPLANATION | MACHINE TYPE | CONNECTION DESTINATION NW | VOLUME |
|---|---|---|---|---|---|
| VSERVER00001 | | | | | |
| VSERVER00002 | | | | | |

NETWORK INFORMATION

| NETWORK ID | NW TYPE | ROUTING INFORMATION |
|---|---|---|
| NET00001 | | |
| NET00002 | | |

VOLUME INFORMATION

| VOLUME ID | SIZE |
|---|---|
| VDISK00001 | |

F I G. 1 3 http://api.providera.com/cimi/6896/systems/VSYS00001/
machines/VSERVER00001

93

F I G. 1 4 A

```
<machine>
  <id>http://api.providera.com/cimi/6896/systems/VSYS00
001/machines/VSERVER00001</id>
  <state>RUNNING</state>
  <cpu>1</cpu>
  <memory>5000000</memory>
 <disks>
    <disk >
      <capacity>5000000000</capacity>
      <initialLocation href=http://api.providera.com/cimi/
6896/
images/IMG00001>
    </disk>
  </disks>
<networkInterfaces>
    <networkInterface>
      <address>192.168.1.23</address>
      <network href=http://api.providera.com/cimi/6896/sys
tems/VSYS00001/networks/NET00001>
    </networkInterface>
 <networkInterfaces>
 <volumes>
</volumes>
</machine>
```

94

F I G. 1 4 B

29a

VIRTUAL MACHINE INFORMATION

| MACHINE ID | IMAGE ID | VM IMAGE EXPLANATION | MACHINE TYPE | CONNECTION DESTINATION NW | VOLUME |
|---|---|---|---|---|---|
| VSERVER00001 | IMG00001 | | cpu=1, mem=5MB, disk=5GB | NET00001 | NO |
| VSERVER00002 | | | | | |

NETWORK INFORMATION

| NETWORK ID | NW TYPE | ROUTING INFORMATION |
|---|---|---|
| NET00001 | | |
| NET00002 | | |

VOLUME INFORMATION

| VOLUME ID | SIZE |
|---|---|
| VDISK00001 | |

FIG. 15

```
http://api.providera.com/cimi/6896/systems/VSYS00001/
machines/VSERVER00002
```

```
<machine>
  <id>http://api.providera.com/cimi/6896/systems/VSYS00
001/machines/VSERVER00002</id>
  <state>RUNNING</state>
  <cpu>1</cpu>
  <memory>5000000</memory>
  <disks>
    <disk >
      <capacity>5000000000</capacity>
      <initialLocation href=http://api.providera.com/cimi/6896/
images/IMG00002>
    </disk>
  </disks>
 <networkInterfaces>
    <networkInterface>
      <address>192.168.2.23</address>
      <network href=http://api.providera.com/cimi/6896/sys
tems/VSYS00001/networks/NET00002>
    </networkInterface>
  <networkInterfaces>
  <volumes>
    <volume href=http://api.providera.com/cimi/6896/system
s/VSYS00001/volumes/VDISK00001>
    </volumes>
</machine>
```

VIRTUAL MACHINE INFORMATION

| MACHINE ID | IMAGE ID | VM IMAGE EXPLANATION | MACHINE TYPE | CONNECTION DESTINATION NW | VOLUME |
|---|---|---|---|---|---|
| VSERVER00001 | IMG00001 | | cpu=1, mem=5MB, disk=5GB | NET00001 | NO |
| VSERVER00002 | **IMG00002** | | **cpu=1, mem=5MB, disk=5GB** | **NET00002** | **VDISK00001** |

NETWORK INFORMATION

| NETWORK ID | NW TYPE | ROUTING INFORMATION |
|---|---|---|
| NET00001 | | |
| NET00002 | | |

VOLUME INFORMATION

| VOLUME ID | SIZE |
|---|---|
| VDISK00001 | |

F I G. 1 7 http://api.providera.com/6898/images/

```
<machineImages>
  <machineImage>
    <id>http://api.providera.com/6896/images/IMG00001</id>
    <name>CentOS 5.6 Tomcat 6.0</name>
  </machineImage>
   <machineImage>
    <id>http://api.providera.com/6896/images/IMG00002</id>
    <name>CentOS 5.6 MySQL 5.5</name>
  </machineImage>
</machineImages>
```

VIRTUAL MACHINE INFORMATION

| MACHINE ID | IMAGE ID | VM IMAGE EXPLANATION | MACHINE TYPE | CONNECTION DESTINATION NW | VOLUME |
|---|---|---|---|---|---|
| VSERVER00001 | IMG00001 | CentOS 5.5<br>Tomcat 6.0 | cpu=1,<br>mem=5MB,<br>disk=5GB | NET00001 | NO |
| VSERVER00002 | IMG00002 | CentOS 5.5<br>MySQL 5.6 | cpu=1,<br>mem=5MB,<br>disk=5GB | NET00002 | VDISK00001 |

NETWORK INFORMATION

| NETWORK ID | NW TYPE | ROUTING INFORMATION |
|---|---|---|
| NET00001 | | |
| NET00002 | | |

VOLUME INFORMATION

| VOLUME ID | SIZE |
|---|---|
| VDISK00001 | |

VIRTUAL MACHINE INFORMATION

| MACHINE ID | IMAGE ID | VM IMAGE EXPLANATION | MACHINE TYPE | CONNECTION DESTINATION NW | VOLUME |
|---|---|---|---|---|---|
| VSERVER00001 | IMG00001 | CentOS 5.5<br>Tomcat 6.0 | cpu=1,<br>mem=5MB,<br>disk=5GB | NET00001 | NO |
| VSERVER00002 | IMG00002 | CentOS 5.5<br>MySQL 5.6 | cpu=1,<br>mem=5MB,<br>disk=5GB | NET00002 | VDISK00001 |

NETWORK INFORMATION

| NETWORK ID | NW TYPE | ROUTING INFORMATION |
|---|---|---|
| NET00001 | public | NET00002 |
| NET00002 | private | NET00001 |

VOLUME INFORMATION

| VOLUME ID | SIZE |
|---|---|
| VDISK00001 | |

VIRTUAL MACHINE INFORMATION

| MACHINE ID | IMAGE ID | VM IMAGE EXPLANATION | MACHINE TYPE | CONNECTION DESTINATION NW | VOLUME |
|---|---|---|---|---|---|
| VSERVER00001 | IMG00001 | CentOS 5.5 Tomcat 6.0 | cpu=1, mem=5MB, disk=5GB | NET00001 | NO |
| VSERVER00002 | IMG00002 | CentOS 5.5 MySQL 5.6 | cpu=1, mem=5MB, disk=5GB | NET00002 | VDISK00001 |

NETWORK INFORMATION

| NETWORK ID | NW TYPE | ROUTING INFORMATION |
|---|---|---|
| NET00001 | public | NET00002 |
| NET00002 | private | NET00001 |

VOLUME INFORMATION

| VOLUME ID | SIZE |
|---|---|
| VDISK00001 | 100GB |

F I G. 2 1

```
http://providerb.com/api/6838/deployments/7326
```

```
<deployment>
  <nickname>Test System</nickname>
  <href>http://providerb.com/api/6838/deployment/
d7326</href>
 <networkConnectionSet>
    <networkConnection>
      <href>http://providerb.com/api/6836/network_
connection/n5071</href>
    </networkConnection>
    <networkConnection>
       <href>http://providerb.com/api/6836/network_
connection/n5072</href>
    </networkConnection>
  </networkConnctionSet>
 <instances>
    <instance>
      <href>http://providerb.com/api/6836/instance
s/i2746</href>
    </instance>
    <instance>
      <href>http://providerb.com/api/6836/instance
s/i2747</href>
    </instance>
  </instances>
  <block_storage_volumes>
    <block_storage_volume>
      <href>http://providerb.com/api/6836/ec2_ebs
_volumes/v5272</href>
    </block_storage_volume>
  </block_storage_volumes>
</deployment>
```

VIRTUAL MACHINE INFORMATION

| MACHINE ID | IMAGE ID | VM IMAGE EXPLANATION | MACHINE TYPE | CONNECTION DESTINATION NW | VOLUME |
|---|---|---|---|---|---|
| i2746 | | | | | |
| i2747 | | | | | |

NETWORK INFORMATION

| NETWORK ID | NW TYPE | ROUTING INFORMATION |
|---|---|---|
| n5071 | | |
| n5072 | | |

VOLUME INFORMATION

| VOLUME ID | SIZE |
|---|---|
| v5272 | |

F I G. 2 3

```
http://providerb.com/api/cimi/6836/systems/7326/machines/i2746
```

```
<machine>
  <id>http://api.providera.com/cimi/6836/machines/i2746</id>
  <state>RUNNING</state>
  <cpu>1</cpu>
  <memory>6000000</memory>
  <disks>
    <disk >
      <capacity>6000000000</capacity>
      <initialLocation href=http://api.providera.com/cimi/6836/images/ami3627>
    </disk>
    </disks>
  <networkInterfaces>
    <networkInterface>
      <address>192.168.1.23</address>
      <network href=http://api.providera.com/cimi/6836/systems/7326/networks/n5071>
    </networkInterface>
  <networkInterfaces>
</machine>
```

VIRTUAL MACHINE INFORMATION

| MACHINE ID | IMAGE ID | VM IMAGE EXPLANATION | MACHINE TYPE | CONNECTION DESTINATION NW | VOLUME |
|---|---|---|---|---|---|
| i2746 | ami3627 | | cpu=1,<br>mem=6MB,<br>disk=6GB | n5071 | NO |
| i2747 | | | | | |

NETWORK INFORMATION

| NETWORK ID | NW TYPE | ROUTING INFORMATION |
|---|---|---|
| n5071 | | |
| n5072 | | |

VOLUME INFORMATION

| VOLUME ID | SIZE |
|---|---|
| v5272 | |

VIRTUAL MACHINE INFORMATION

| MACHINE ID | IMAGE ID | VM IMAGE EXPLANATION | MACHINE TYPE | CONNECTION DESTINATION NW | VOLUME |
|---|---|---|---|---|---|
| i2746 | ami3627 | | cpu=1, mem=6MB, disk=6GB | n5071 | NO |
| i2747 | ami3628 | | cpu=1, mem=6MB, disk=6GB | n5072 | v5272 |

NETWORK INFORMATION

| NETWORK ID | NW TYPE | ROUTING INFORMATION |
|---|---|---|
| n5071 | | |
| n5072 | | |

VOLUME INFORMATION

| VOLUME ID | SIZE |
|---|---|
| v5272 | |

VIRTUAL MACHINE INFORMATION

| MACHINE ID | IMAGE ID | VM IMAGE EXPLANATION | MACHINE TYPE | CONNECTION DESTINATION NW | VOLUME |
|---|---|---|---|---|---|
| i2746 | ami3627 | CentOS 5.5 Tomcat 6.0 | cpu=1, mem=6MB, disk=6GB | n5071 | NO |
| i2747 | ami3628 | CentOS 5.5 MySQL 5.6 | cpu=1, mem=6MB, disk=6GB | n5072 | v5272 |

NETWORK INFORMATION

| NETWORK ID | NW TYPE | ROUTING INFORMATION |
|---|---|---|
| n5071 | | |
| n5072 | | |

VOLUME INFORMATION

| VOLUME ID | SIZE |
|---|---|
| v5272 | |

F I G. 2 7

29b

VIRTUAL MACHINE INFORMATION

| MACHINE ID | IMAGE ID | VM IMAGE EXPLANATION | MACHINE TYPE | CONNECTION DESTINATION NW | VOLUME |
|---|---|---|---|---|---|
| i2746 | ami3627 | CentOS 5.5 Tomcat 6.0 | cpu=1, mem=6MB, disk=6GB | n5071 | NO |
| i2747 | ami3628 | CentOS 5.5 MySQL 5.6 | cpu=1, mem=6MB, disk=6GB | n5072 | v5272 |

NETWORK INFORMATION

| NETWORK ID | NW TYPE | ROUTING INFORMATION |
|---|---|---|
| n5071 | private | n5072 |
| n5072 | public | n5071 |

VOLUME INFORMATION

| VOLUME ID | SIZE |
|---|---|
| v5272 | |

VIRTUAL MACHINE INFORMATION

| MACHINE ID | IMAGE ID | VM IMAGE EXPLANATION | MACHINE TYPE | CONNECTION DESTINATION NW | VOLUME |
|---|---|---|---|---|---|
| i2746 | ami3627 | CentOS 5.5<br>Tomcat 6.0 | cpu=1,<br>mem=6MB,<br>disk=6GB | n5071 | NO |
| i2747 | ami3628 | CentOS 5.5<br>MySQL 5.6 | cpu=1,<br>mem=6MB,<br>disk=6GB | n5072 | v5272 |

NETWORK INFORMATION

| NETWORK ID | NW TYPE | ROUTING INFORMATION |
|---|---|---|
| n5071 | private | n5072 |
| n5072 | public | n5071 |

VOLUME INFORMATION

| VOLUME ID | SIZE |
|---|---|
| v5272 | 100GB |

PROVIDER A (MIGRATION SOURCE)

| NETWORK ID | NETWORK ATTRIBUTE | MACHINE ID | VM IMAGE EXPLANATION | NUMBER OF VMS |
|---|---|---|---|---|
| VNETO 0001 | public | VSERVE R00001 | CentOS 5.6 Tomcat 6.0 | 1 |

| NETWORK ID | NETWORK ATTRIBUTE | MACHINE ID | VM IMAGE EXPLANATION | NUMBER OF VMS |
|---|---|---|---|---|
| VNETO 0002 | private | VSERVE R00002 | CentOS 5.6 MySQL 5.5 | 1 |

PROVIDER A (MIGRATION SOURCE)

| NETWORK ID | NETWORK ATTRIBUTE | MACHINE ID | VM IMAGE EXPLANATION | NUMBER OF VMS |
|---|---|---|---|---|
| n5071 | public | i2746 | CentOS 5.6 Tomcat 6.0 | 1 |

| NETWORK ID | NETWORK ATTRIBUTE | MACHINE ID | VM IMAGE EXPLANATION | NUMBER OF VMS |
|---|---|---|---|---|
| n5072 | private | i2747 | CentOS 5.6 MySQL 5.5 | 1 |

| NETWORK OF MIGRATION SOURCE PROVIDER | NETWORK OF MIGRATION DESTINATION CANDIDATE PROVIDER |
|---|---|
| VNET00001 | n5071 |
| VNET00002 | n5072 |

FIG. 31

OPERATION ENVIRONMENT MIGRATION SUPPORT DEVICE, RECORD MEDIUM WITH PROGRAM STORED THEREFOR, AND METHOD THEREFOR

CROSS-REFERENCE TO RELATED APPLICATION

This application is based upon and claims the benefit of priority of the prior Japanese Patent Application No. 2013-064828, filed on Mar. 26, 2013, the entire contents of which are incorporated herein by reference.

FIELD

The present invention relates to a technology for supporting a migration of an operation environment for a virtual machine.

BACKGROUND

As a new utility form of an ICT (Information and Communication Technology) system architecture, cloud computing which integrally manages hardware, software, data, and the like, at a data center, and the like, is attracting attention. One of the service forms of cloud computing is an IaaS (Infrastructure as a Service). An IaaS is a service which provides a network, hardware (CPUs/memories/hard disks), storage, and the like.

Cloud computing, with regard to its management property, may complicate an infrastructure model even further. Accordingly, it is not easy to migrate a system among IaaSs when there are different providers for the IaaSs.

Therefore, as indicated below, an evaluation technology exists that evaluates whether or not computing components such as data center components and the like should be migrated to a cloud computing infrastructure, and specifies a strategic plan for the migration. According to the evaluation technology, a system includes a memory, an interface, and a processor. The processor receives a data center configuration from a user (a data center configuration includes a calculation capacity and a storage capacity). The processor evaluates a cloud computing configuration that is equivalent to a data center configuration. The processor specifies a migration time period from the data center to the cloud computing. The processor specifies a plurality of trend values which indicate changes in the calculation capacity and the storage capacity over the entire time period. The processor creates a migration strategy (the strategy is capable of explaining changes in the calculation capacity and the storage capacity) from the data center to the cloud computing over the entire time period. With this, the processor provides graphical outputs and numerical outputs of the strategy to the user.

Patent Document 1: Japanese Laid-open Patent Publication No. 2011-150563

SUMMARY

An operation environment migration support device according to the present embodiment includes a first obtaining unit, a second obtaining unit, a first determination unit, a second determination unit, and an outputting unit. The first obtaining unit obtains, from each of a first physical server device and a second physical server device operated by a virtual machine, element information on an element of a virtual resource which constructs an operation environment for the virtual machine. The second obtaining unit obtains, from each of the first physical server device and the second physical server device, subdivided element information that is information on a subdivided element indicative of an element which constructs the element indicated by the element information obtained from each of the first physical server device and the second physical server device. The first determination unit, on the basis of the subdivided element information, determines whether or not types of a communication network obtained from each of the first physical server device and the second physical server device and information on the virtual machine which belongs to the communication network match up, respectively. The second determination unit performs the following processing when it is determined that types of the communication network and information on the virtual machine which belongs to the communication network match up. That is, the second determination unit determines whether or not a performance of a subdivided element indicated by subdivided element information obtained from the second physical server device exceeds a performance of a subdivided element indicated by element information obtained from the first physical server device. The outputting unit performs the following processing when it is determined that a performance of a subdivided element indicated by subdivided element information obtained from the second physical server device exceeds a performance of a subdivided element indicated by element information obtained from the first physical server device. That is, the outputting unit outputs that an operation environment for the virtual machine of the first physical server device is migratable to the second physical server device.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 illustrates one example of an API correspondence table in the present embodiment.

FIG. 6 illustrates one example of a network correspondence relationship table in the present embodiment.

FIG. 7 illustrates one example of a template of an extended IaaS management target in the present embodiment.

FIG. 8 illustrates one example of an entire flow of migration determination processing in the present embodiment.

FIG. 9 illustrates one example of a detailed flow of S7 in the flow of FIG. 8.

FIG. 10 illustrates one example of a detailed flow of S9 in the flow of FIG. 8.

FIG. 11 illustrates one example of a detailed flow of S9-3 in the flow of FIG. 10.

FIGS. 12A-12B illustrate one example (No. 1) of a request to a provider A and a response corresponding thereto in the present embodiment.

FIG. 13 illustrates one example (No. 1) of an incompletely prepared configuration information table on a provider A in the present embodiment.

FIGS. 14A-14B illustrate one example (No. 2) of a request to a provider A and a response corresponding thereto in the present embodiment.

FIG. 15 illustrates one example (No. 2) of an incompletely prepared configuration information table on a provider A in the present embodiment.

FIGS. 16A-16B illustrate one example (No. 3) of a request to a provider A and a response corresponding thereto in the present embodiment.

FIG. 17 illustrates one example (No. 3) of an incompletely prepared configuration information table on a provider A in the present embodiment.

FIGS. 18A-18B illustrate one example (No. 4) of a request to a provider A and a response corresponding thereto in the present embodiment.

FIG. 19 illustrates one example (No. 4) of an incompletely prepared configuration information table on a provider A in the present embodiment.

FIG. 20 illustrates one example (No. 5) of an incompletely prepared configuration information table on a provider A in the present embodiment.

FIG. 21 illustrates one example (No. 6) of an incompletely prepared configuration information table on a provider A in the present embodiment.

FIGS. 22A-22B illustrate one example (No. 1) of a request to a provider B and a response corresponding thereto in the present embodiment.

FIG. 23 illustrates one example (No. 1) of an incompletely prepared configuration information table on a provider B in the present embodiment.

FIGS. 24A-24B illustrate one example (No. 2) of a request to a provider B and a response corresponding thereto in the present embodiment.

FIG. 25 illustrates one example (No. 2) of an incompletely prepared configuration information table on a provider B in the present embodiment.

FIG. 26 illustrates one example (No. 3) of an incompletely prepared configuration information table on a provider B in the present embodiment.

FIG. 27 illustrates one example (No. 4) of an incompletely prepared configuration information table on a provider B in the present embodiment.

FIG. 28 illustrates one example (No. 5) of an incompletely prepared configuration information table on a provider B in the present embodiment.

FIG. 29 illustrates one example (No. 6) of an incompletely prepared configuration information table on a provider B in the present embodiment.

FIGS. 30A-30B illustrate a diagram for explaining a determination of whether or not there is a network in which a "network attribute", "the number of VMs", and "an explanation of an image" match up in the present embodiment.

FIG. 31 illustrates one example of a network relationship table in the present embodiment.

DESCRIPTION OF EMBODIMENTS

Figure 1:
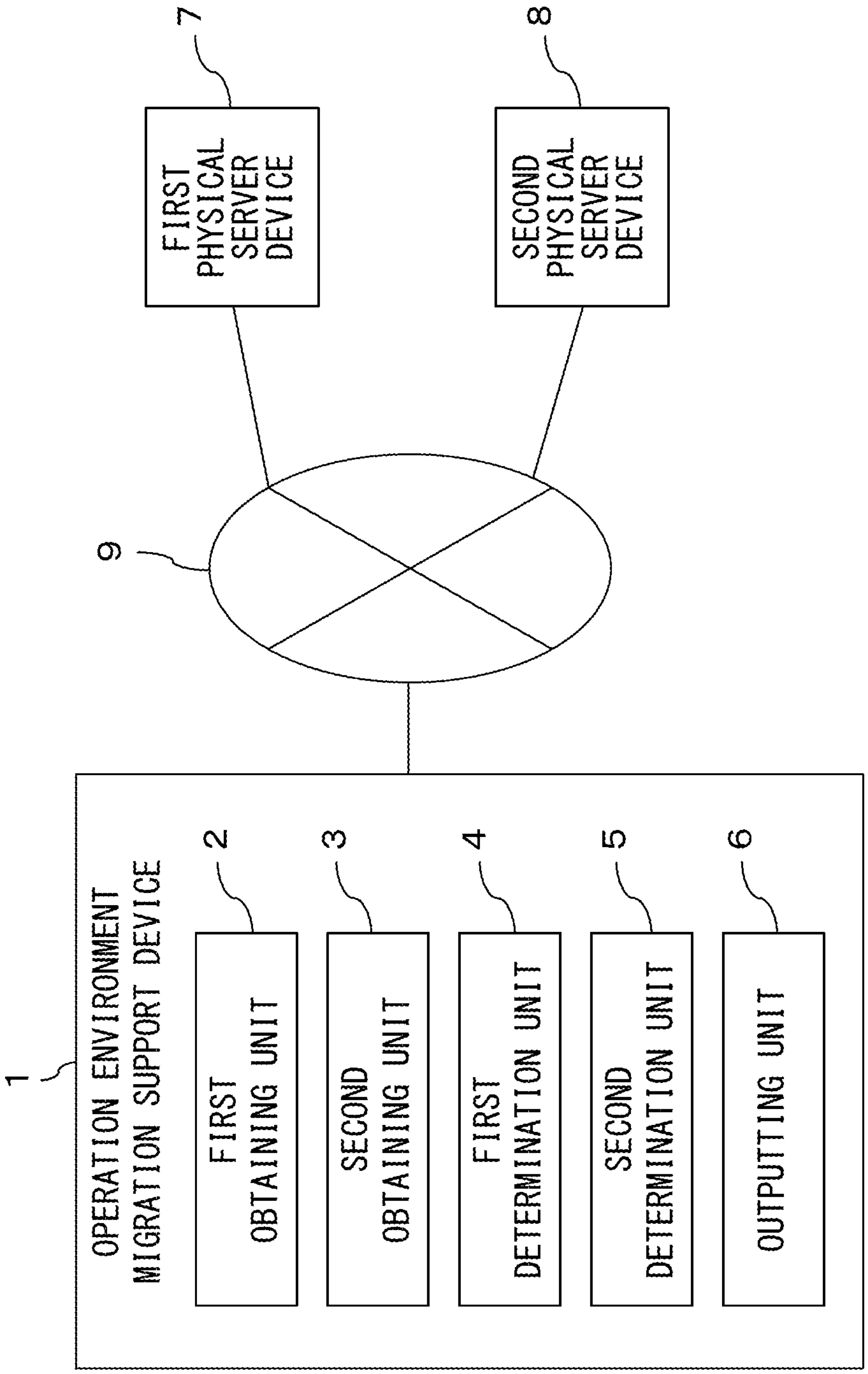
FIG. 1 illustrates one example of a migration support device according to the present embodiment.

In an IaaS, there is a component which is common among providers and a component provided by each provider for differentiating from other providers.

An advantage for a commonalized component is that an IaaS management becomes interconnectable among providers. That is to say, a cloud computing user may manage a resource of a plurality of providers by using the same interface.

On the other hand, when the cloud computing user changes a provider, migrating a component provided for the differentiation among providers is considered. However, among providers, the components provided for the differentiation do not have compatibility, and accordingly, when a provider differs, it cannot be determined whether or not the component is migratable.

Then, using the above evaluation technology is considered. However, the above technology compares the costs of the same configurations which the user knows beforehand with regard to the migration among providers, and it cannot be compared among different providers which the user does not know beforehand.

Thus, when the provider differs, since it cannot be determined whether or not the component constructing the IaaS may be migrated among providers, the migration of the component which constructs the IaaS among providers is not easily performed.

One aspect of the present invention provides a technology for supporting a migration of an operation environment for a virtual machine among physical servers.

A component, including a virtual machine (VM), a virtual machine image thereof, a volume corresponding to the virtual machine, and a network to which the virtual machine is connected, is managed in units of "a basic IaaS management target", and this unit of management is common among providers. A virtual machine refers to a virtual computer which operates on a physical computer. A virtual machine image refers to a file system used to start up a virtual machine. A file system refers to a mechanism for managing data recorded in a storage device. A volume refers to a storage area.

Since a common interface may be utilized among IaaSs with the basic IaaS management target, a mutual connection to the basic IaaS management target may be performed among providers to perform the IaaS management. That is to say, with the same interface, a cloud computing user may manage both a resource of a provider A and a resource of a provider B. In addition, a program which performs management for each provider need not be separately written. Further, it can prevent the cloud computing user from depending on a specific provider.

On the other hand, another unit of management called "an extended IaaS management target" is a convenient component provided by a provider A for differentiating from a provider B, and is configured by combinations of the basic IaaS management targets. Since the extended IaaS management target does not have compatibility, the cloud computing user cannot manage the resource of the provider A by the resource of the provider B even when describing the same configuration (for example, three-tiered architecture) in a source code using the extended IaaS management target of different providers. In addition, since the extended IaaS management target does not have compatibility among providers, when a provider differs, a determination of whether or not the IaaS management target is the same cannot be made, either.

Then, in the present embodiment, explanations are given for a determination technology of determining whether or not the extended IaaS management target is migratable among providers. With regard to the basic IaaS management target which constitutes each extended IaaS management target, information may be obtained by using a common application program interface (API). However, since a method of managing configuration information which constitutes the extended IaaS management target in the extended IaaS management target differs, it cannot be determined to which of the configuration information of the extended IaaS management target of the provider B the configuration of the extended IaaS management target of the provider A corresponds. Accordingly, the basic IaaS management targets which correspond to the configuration information of the extended IaaS management target cannot be compared. Therefore, in the present embodiment, a status of the basic IaaS management target which corresponds to each piece of configuration information of the extended IaaS management target is confirmed, and virtual resource groups are compared that are utilized with regard to the construction of a virtual network, as mentioned later.

Hereafter, the present embodiment is explained in detail.

FIG. 1 illustrates one example of a migration support device according to the present embodiment. A migration support device 1 includes a first obtaining unit 2, a second obtaining unit 3, a first determination unit 4, a second determination unit 5, and an outputting unit 6.

The first obtaining unit 2 obtains, from each of a first physical server device 7 and a second physical server device 8 operated by a virtual machine, element information on an element of a virtual resource which constructs an operation environment for the virtual machine. As an example of the first obtaining unit 2, a later mentioned obtaining unit 24 is exemplified. As an example of the element information, the configuration information of the extended IaaS management target is exemplified.

The second obtaining unit 3 obtains, from each of the first physical server device 7 and the second physical server device 8, subdivided element information which is information on a subdivided element indicative of an element which constructs the element indicated by the element information obtained from each of the first physical server device 7 and the second physical server device 8. As an example of the first obtaining unit 2, a later mentioned obtaining unit 24 is exemplified. As an example of the subdivided element information, the configuration information of the basic IaaS management target is exemplified.

The first determination unit 4, on the basis of the subdivided element information, determines whether or not types of a communication network obtained from each of the first physical server device 7 and the second physical server device 8 and information on the virtual machine which belongs to the communication network match up, respectively. As an example of the first determination unit 4, a later mentioned preparation unit 25 is exemplified.

The second determination unit 5 performs the following processing when it is determined that types of the communication network and information on the virtual machine which belongs to the communication network match up, respectively. That is, the second determination unit 5 determines whether or not a performance of a subdivided element indicated by subdivided element information obtained from the second physical server device 8 exceeds a performance of a subdivided element indicated by element information obtained from the first physical server device 7. As an example of the second determination unit 5, a later mentioned VM comparison unit 26 is exemplified.

The outputting unit 6 performs the following processing when it is determined that a performance of a subdivided element indicated by subdivided element information obtained from the second physical server device 8 exceeds a performance of a subdivided element indicated by element information obtained from the first physical server device 7. That is, the outputting unit 6 outputs information which indicates that an operation environment for the virtual machine of the first physical server device 7 is migratable to the second physical server device 8. As an example of the outputting unit 6, a later mentioned outputting unit 27 is exemplified.

The subdivided element information obtained from each of the first and second physical server devices 7 and 8 includes an attribute of a communication network, routing information of the communication network, and information on a file system of the virtual machine which belongs to the communication network.

The first determination unit 4 performs the following processing when an attribute of a communication network, routing information of the communication network, and information on a file system of the virtual machine which belongs to the communication network match up. That is, the first determination unit 4 relates communication network identification information which identifies the communication network obtained from each of the first and second physical server devices.

The second determination unit 5, on the basis of the subdivided element information, compares a type of a file system of the virtual machine which belongs to the communication network corresponding to each piece of the related communication network identification information with resource information assigned to the virtual machine. As a result of the comparison, the second determination unit 5 determines whether or not a performance of a subdivided element indicated by subdivided element information obtained from the second physical server device exceeds a performance of a subdivided element indicated by subdivided element information obtained from the first physical server device.

With the above-mentioned configuration, a status of the basic IaaS management target which corresponds to each piece of configuration information of the extended IaaS management target may be confirmed, and virtual resource groups utilized for constructing the virtual network may be compared. As a result of the comparison, when resource groups match up, and when the performance of the resource of a migration destination exceeds the performance of the resource of a migration source, it is determined to be migratable. As a result, among physical servers, a migration of the infrastructure which is a base for constructing an operation environment for the virtual machine may be supported.

Figure 2:
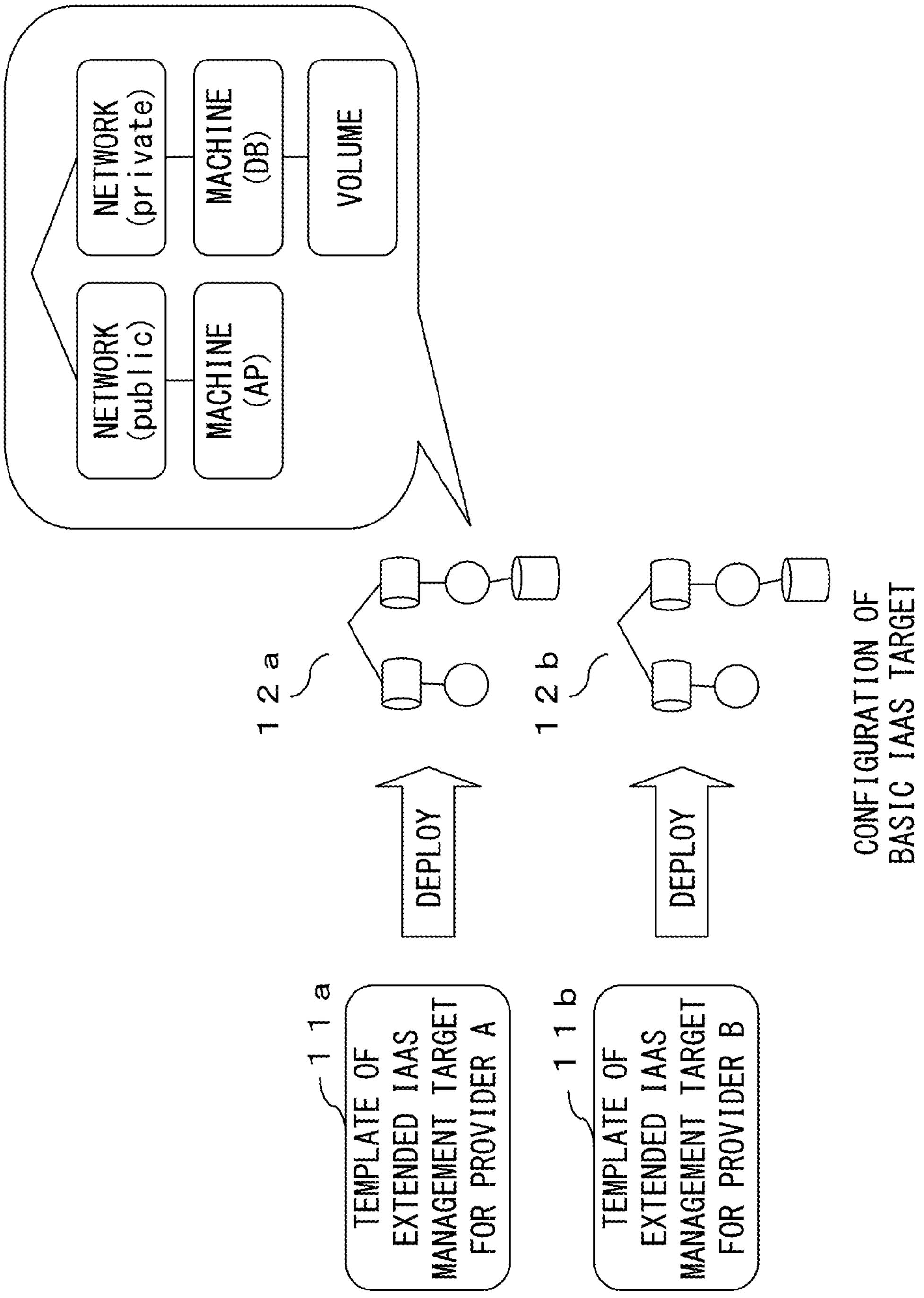
FIG. 2 illustrates a diagram for explaining migration determination processing according to the present embodiment.

FIG. 2 illustrates a diagram for explaining migration determination processing according to the present embodiment. The user inputs templates 11*a* and 11*b* of the extended IaaS management target to a later-mentioned migration support device, using an inputting device. The migration support device, on the basis of the templates 11*a* and 11*b* that were input, deploys the extended IaaS management target in an information processing device (physical server) which realizes the IaaS in each provider. Here, a disposition of the extended IaaS management target refers to assigning a virtual resource to a physical server so that the virtual machine is operable, by setting components which construct the extended IaaS management target in the physical server.

Next, the migration support device obtains, from the physical server of each provider, configuration information of the extended IaaS management target, and obtains, from the configuration information of the extended IaaS management target, the configuration information 12*a* and 12*b* of the basic IaaS management target. Hereafter, a physical server of a provider is called “a provider”. Each provider uses a standard API and obtains the configuration information 12*a* and 12*b* of the basic IaaS management target which constitutes the extended IaaS management target that was deployed on the basis of the templates 11*a* and 11*b*. Each provider transmits the configuration information 12*a* and 12*b* of the obtained basic IaaS management target to the migration support device.

The configuration information 12*a* and 12*b* of the basic IaaS management target includes, as an example, a network (network attribute: public/private), a machine for an application program (AP), a machine for a database (DB), a volume, and the like. The network attribute indicates a disclosure range of a network. The network attribute (private) indicates a network which is disclosed to a specified person, and the network attribute (public) indicates a network which is disclosed to those other than a specified person as well.

The migration support device matches up the basic IaaS management targets included in the extended IaaS management targets that were obtained from each provider and compares the configuration information, as mentioned later. Here, the migration support device matches up the networks and compares the virtual machine connected to the corresponding network.

With this, it may be determined whether or not migrating from the template of the extended IaaS management target of the currently used provider to the template of the extended IaaS management target of the provider scheduled to be migrated is possible. For example, it is defined that a user X was disposing the extended IaaS management target by utilizing the template 11*a* of the extended IaaS management target for a provider A. When the user X migrates the extended IaaS management target from a provider A to a provider B, it may be determined whether or not the migration is possible from the template of the extended IaaS management target of the provider A to the template of the extended IaaS management target of the provider B.

Here, each provider is defined to include a standard API as well as a unique API for operating the basic IaaS management target. As an example of the standard API, a CIMI (Cloud Infrastructure Management Interface) V1.0 formulated by a DMTF (Distributed Management Task Force) is exemplified. Further, each provider has a comparison table of a unique API and a standard API.

Each provider may operate each basic IaaS management target both with the unique API and the standard API. For example, the provider, by using the unique API or the standard API, may obtain information on a virtual machine image, a network to which a virtual machine is connected, a disk to which a virtual machine is connected, and the like. The information of the virtual machine image may be obtained from an explanation text (for example, types of OSs, installed software, and the like), and the like, as mentioned later. The relationship between the basic IaaS management targets of a network to which a virtual machine is connected and a volume connected to a virtual machine, and the like, may be obtained by the standard API.

Figure 3:
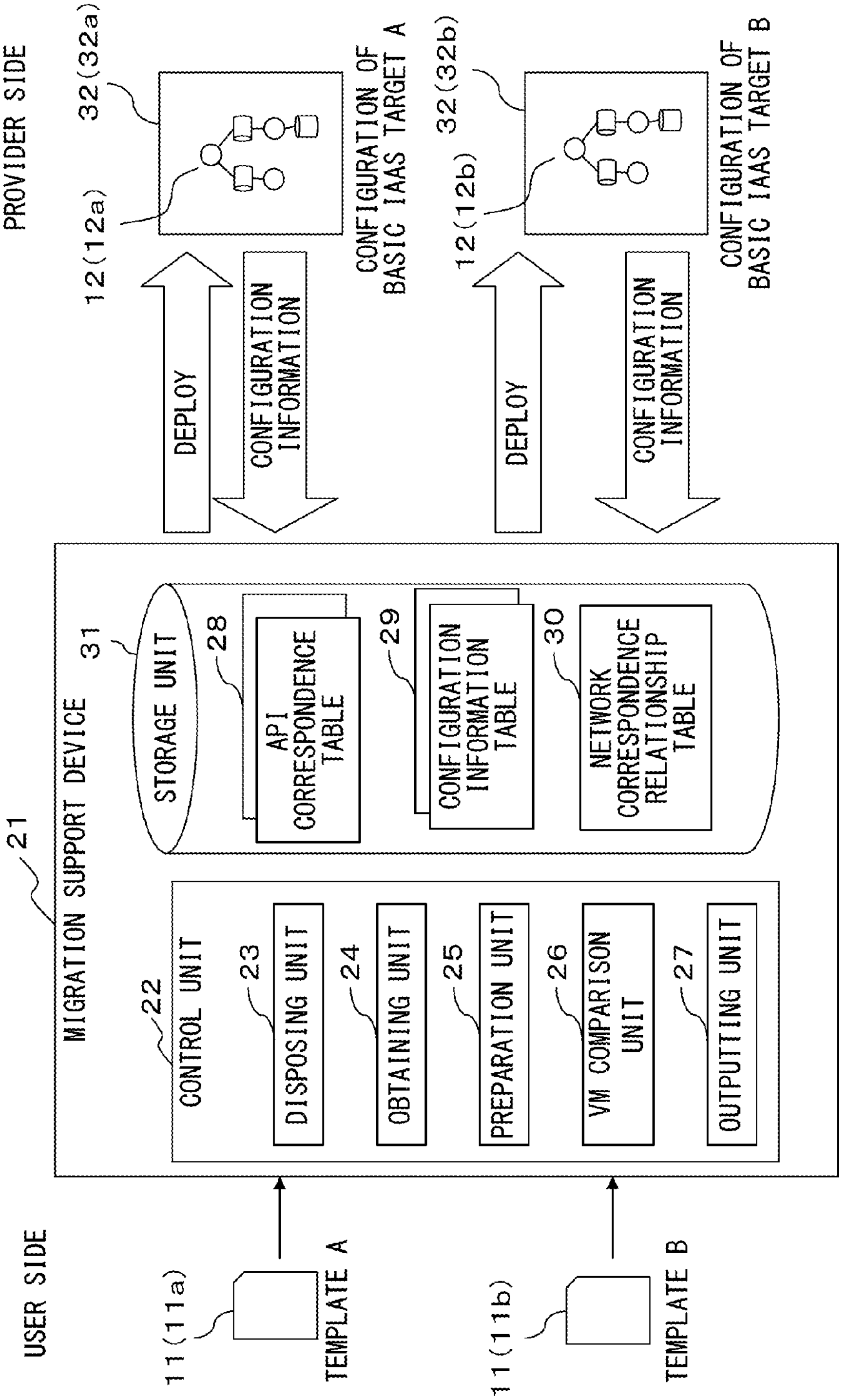
FIG. 3 illustrates a block diagram of a migration support device according to the present embodiment.

FIG. 3 illustrates a block diagram of a migration support device according to the present embodiment. The migration support device 21 includes a control unit 22 and a storage unit 31. The control unit 22 is an arithmetic processing unit such as a processor, and the like. The control unit 22 functions as a disposing unit 23, an obtaining unit 24, a preparation unit 25, a VM comparison unit 26, and an outputting unit 27, by reading from the storage device the program in the present embodiment and executing the program.

The disposing unit 23 uses the template 11 of the extended IaaS management target that was input from the user and deploys the configuration of the extended IaaS management target to the migration source provider and the migration destination candidate provider.

The obtaining unit 24 obtains the configuration information of the extended IaaS management target from the migration source provider and the migration destination candidate provider to which the configuration of the extended IaaS management target is deployed. The obtaining unit 24 obtains from the migration source provider and the migration destination candidate provider the basic IaaS management target which corresponds to respective configuration information of the extended IaaS management target.

The preparation unit 25 matches up, from the configuration information of the basic IaaS management target obtained from the migration source provider and the migration destination candidate provider, the networks of which the network attribute, the number of virtual machines, and a virtual machine image match up, and prepares a network correspondence relationship table 30. With this, by comparing the configuration information of the basic IaaS management target obtained from the migration source provider and the migration destination candidate provider, the preparation unit 25 may analyze to which basic IaaS management target of the migration destination candidate provider the basic IaaS management target of the migration source provider corresponds.

The VM comparison unit 26 compares a performance of a virtual machine which is connected to a matched up network. As a result of a comparison, when it exceeds the performance of the virtual machine which is connected to the network of the migration destination candidate, the VM comparison unit 26 determines that the extended IaaS management target of the migration source is migratable to a physical server of the migration destination candidate.

The outputting unit 27 outputs a determination result that was determined by the VM comparison unit 26.

The storage device 31 stores an API correspondence table 28, a configuration information table 29, and a network correspondence relationship table 30. An API correspondence table 28 is a table for matching information for reading the standard API set by each provider with parameters used for the standard API. A configuration information table 29 is a table which stores the configuration information of a virtual resource for operating the virtual machine constructed in the physical server of each provider. A network correspondence relationship table 30 is a table which matches network information of the IaaS management target of the migration source to network information of the IaaS management target of the migration destination candidate.

FIG. 4 illustrates one example of an API correspondence table in the present embodiment. An API correspondence table of FIG. 4 is a table for utilizing a standard API operated in the provider. A parameter “$USERID” indicates a user ID.

A parameter "$VSYSID" indicates an ID of the extended IaaS management target of the provider.

The obtaining unit 24 may send a request of "http://api.providera.com/cimi/$USERID/systems/$VSYSID/machines/$VSERV ERID" when it obtains information of the virtual machine in the provider. Here, "$VSYSID" indicates a virtual machine ID.

The obtaining unit 24 may send a request of "http://api.providera.com/cimi/$USERID/systems/$VSYSID/volumes/$VOLUM EID" when it obtains information of the volume in the provider. Here, "$VOLUMEID" indicates a volume ID.

The obtaining unit 24 may send a request of "http://api.providera.com/cimi/$USERID/systems/$VSYSID/networks/$NETID" when it obtains information of the network in the provider. Here, "$NETID" indicates a network ID.

Figure 5:
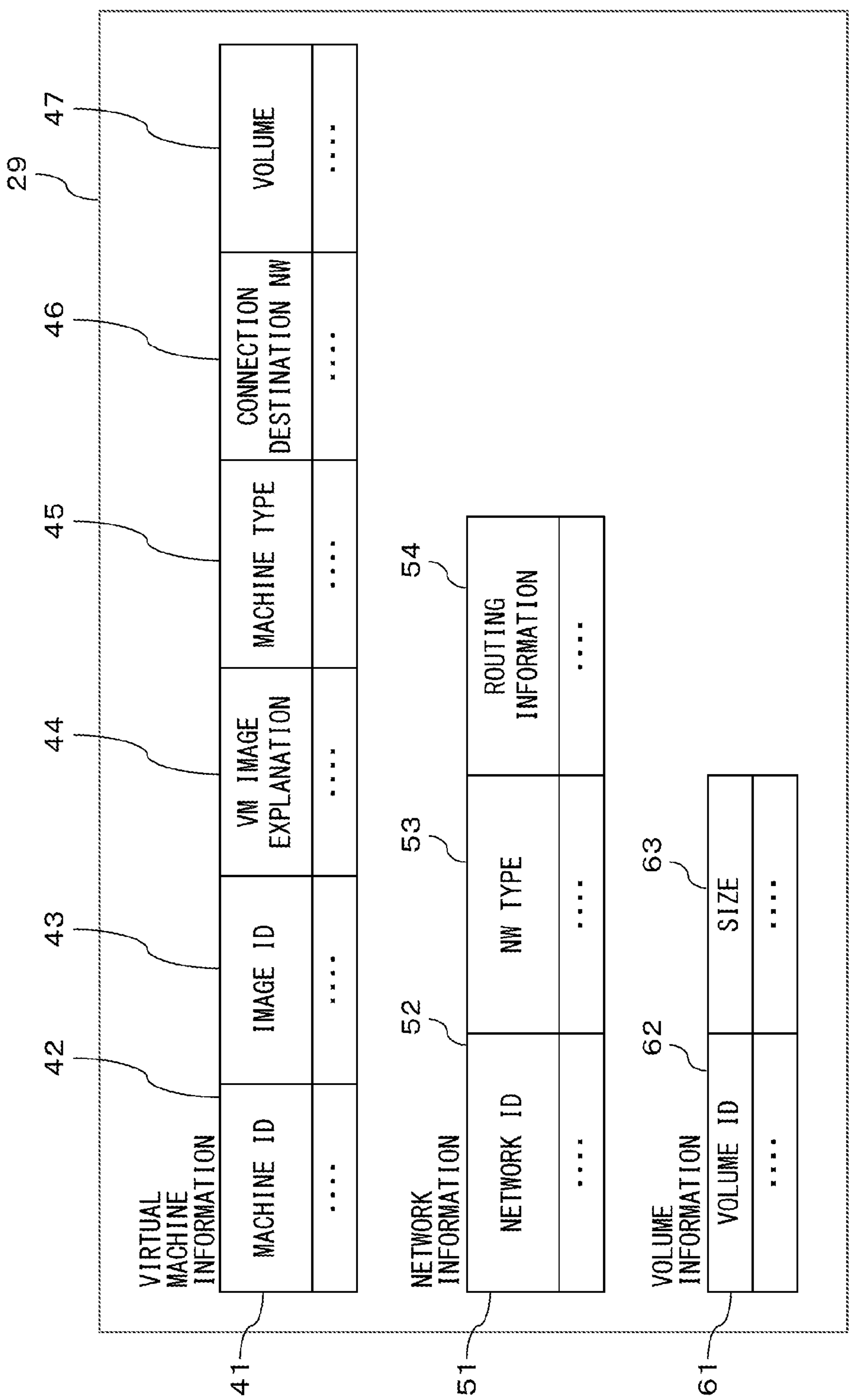
FIG. 5 illustrates one example of a configuration information table in the present embodiment.

FIG. 5 illustrates one example of a configuration information table in the present embodiment. The configuration information table 29 includes virtual machine information 41, network information 51, and volume information 61. The virtual machine information 41 includes data items of "a machine ID" 42, "an image ID" 43, "a VM image explanation" 44, "a machine type" 45, "a connection destination NW" 46, and "a volume" 47.

In the "machine ID" 42, identification information for identifying the virtual machine is stored. In the "image ID" 43, identification information for identifying the virtual machine image is stored. In the "VM image explanation" 44, information for explaining the image is stored. In the "machine type" 45, information on the resource used by the virtual machine is stored. In the "connection destination NW" 46, identification information for identifying the network of the connection destination is stored. In the "volume" 47, a volume name is stored.

The network information 51 includes data items of a "network ID" 52, an "NW type" 53, and "routing information" 54. In the "network ID" 52, identification information for identifying the network is stored. In the "NW type" 53, a type of a network is stored as "public" or "private". In the "routing information" 54, a network ID of a passing-through network is stored.

The volume 61 includes data items of a "volume ID" 62 and a "size" 62. In the "volume ID" 62, identification information for identifying the volume is stored. In the "size" 62, a capacity of the volume is stored.

FIG. 6 illustrates one example of a network correspondence relationship table in the present embodiment. The network correspondence relationship table 30 includes data items of a "network of a migration source provider" 71 and a "network of a migration destination candidate provider" 72. In the "network of a migration source provider" 71, identification information for identifying the network of the basic IaaS management target of the migration source provider is stored. In the "network of a migration destination candidate provider" 72, identification information for identifying the network of the basic IaaS management target of the migration destination candidate provider is stored.

FIG. 7 illustrates one example of a template of an extended IaaS management target in the present embodiment. The template 11 of the extended IaaS management target includes template specified information 81, a network template 82, machine templates 83 and 84, a volume template 85, and the like.

The template specified information 81 includes identification information for identifying a template of the extended IaaS management target to be deployed and a name of the template. The network template 82 defines a name of the network to be deployed and a type (attribute) of the network. The machine templates 83 and 84 define a name of the virtual machine to be deployed, configuration information (the number of CPUs, a memory capacity, and a disk capacity) of the virtual machine, and a name of the network to which the virtual machine belongs. The machine template 83 defines the configuration information of the virtual machine as an application server. The machine template 84 defines the configuration information of the virtual machine as a database (DB) server. The machine template 84 includes a volume template 85. The volume template 85 defines a capacity of the volume assigned to a virtual machine which is constituted of the machine template 84.

Next, explanations are given for migration determination processing in the present embodiment by using FIG. 8 to FIG. 11.

FIG. 8 illustrates one example of an entire flow of migration determination processing in the present embodiment. The migration determination processing includes a configuration information obtaining phase (S1 to S5) and a configuration information comparison phase (S6 to S12). FIG. 9 illustrates one example of a detailed flow of S7 in the flow of FIG. 8. FIG. 10 illustrates one example of a detailed flow of S9 in the flow of FIG. 8. FIG. 11 illustrates one example of a detailed flow of S9-3 in the flow of FIG. 10.

The user uses an inputting device and inputs to a migration support device 21*a* template 11 of the extended IaaS management target of the migration source and the migration destination candidate, respectively. In the present embodiment, the templates 11*a* and 11*b* of the extended IaaS management target are input respectively to providers A and B. The disposing unit 23 obtains the input template 11 of the extended Iaas management target and stores it in the storage unit 31 (S1).

The disposing unit 23 uses the obtained template 11 of the extended IaaS management target and deploys (constructs) components (a virtual server, a network, a volume, and the like) of the extended IaaS management target in the physical server of the migration source provider and the physical server of the migration destination candidate provider (S2). In the present embodiment, the disposing unit 23 uses a template 11*a* of the extended IaaS management target for the provider A and deploys the extended IaaS management target for the provider A (32*a*). In addition, the disposing unit 23 uses a template 11*b* of the extended IaaS management target for the provider B and deploys the extended IaaS management target for the provider B (32*b*).

The obtaining unit 24 obtains from each provider 32 the configuration information of the extended IaaS management target (S3), further obtains the configuration information of the basic IaaS management target which corresponds to respective configuration information of the extended IaaS management target, and stores it in a configuration information table 29 (S4). Here, as indicated below, the obtaining unit 24 uses an API correspondence table 28 and generates a request for obtaining the configuration information of the extended IaaS management target and the configuration information of the basic IaaS management target, from providers A and B.

As indicated in FIG. 12A for example, the obtaining unit 24 uses an API correspondence table 28 and generates a request 91 for obtaining the configuration information of the extended IaaS management target from the provider A. The obtaining unit 24 transmits the generated request 91. The provider A, when it receives the request 91, uses the standard API and generates a response 92 which includes the configuration information of the basic IaaS management target, as indicated in FIG. 12B. The provider A transmits a response 92 to the migration support device 21. The obtaining unit 24 obtains the response 92 which was transmitted from the provider A. In the case of FIG. 12B, the extended IaaS management target is a part which is indicated in boldface, and includes components of two networks indicated as "NET00001" and "NET00002", two virtual machines indicated as "VSERVER00001" and "VSERVER00002", and one volume indicated as "VDISK00001". In this case, the configuration information of the extended IaaS management target corresponds to information which indicates each component of two networks indicated as NET00001 and NET00002, two virtual machines indicated as VSERVER00001 and VSERVER00002, and a volume indicated as VDISK00001.

The obtaining unit 24 stores in the configuration information table 29*a* the obtained configuration information of the extended IaaS management target, as indicated in FIG. 13. In the example of FIG. 13, machine IDs ("VSERVER00001" and "VSERVER00002"), network IDs ("NET00001" and "NET00002"), and a volume ID ("VDISK00001") are stored.

Next, the obtaining unit 24 uses an API correspondence table 28 and generates a request 93 for obtaining the configuration information of the virtual machine indicated by a machine ID ("VSERVER00001") as the configuration information of the basic IaaS management target, as indicated in FIG. 14A. The obtaining unit 24 transmits the generated request 93. The provider A, when it receives the request 93, uses the standard API and generates a response 94 which includes the configuration information of the basic IaaS management target on the machine ID ("VSERVER00001"), as indicated in FIG. 14B. The provider A transmits a response 94 to the migration support device 21. The obtaining unit 24 obtains the response 94 which was transmitted from the provider A. In the case of FIG. 14B, the configuration information of the basic IaaS management target (which is a virtual machine here) indicated by the machine ID ("VSERVER00001") is a part which is indicated in boldface (the number of CPUs, a memory capacity, a disk capacity, a virtual machine image, and a connection destination network). The obtaining unit 24 stores in the configuration information table 29a the configuration information of the virtual machine indicated by the obtained machine ID ("VSERVER00001"), as indicated in FIG. 15. In the example of FIG. 15, in an entry of the machine ID ("VSERVER00001"), an image ID ("IMG00001"), a machine type, and a connection destination network (NW)="NET00001" are stored. In the machine type, a CPU=1, a memory capacity=5 megabites [MB], and a disk capacity=5 gigabites [GB] are stored.

Next, the obtaining unit 24 uses an API correspondence table 28 and generates a request 95 for obtaining the configuration information of the virtual machine indicated by a machine ID ("VSERVER00002") as the basic IaaS management target, as indicated in FIG. 16A. The obtaining unit 24 transmits the generated request 95. The provider A, when it receives the request 95, uses the standard API and generates a response 96 which includes the configuration information of the machine ID ("VSERVER00002"), as indicated in FIG. 16B. The provider A transmits a response 96 to the migration support device 21. The obtaining unit 24 obtains the response 96 which was transmitted from the provider A. In the case of FIG. 16B, the configuration information of the basic IaaS management target (which is a virtual machine here) is a part which is indicated in boldface (the number of CPUs, a memory capacity, a disk capacity, a virtual machine image, a connection destination network, and a volume). The obtaining unit 24 stores in the configuration information table 29a the configuration information of the virtual machine indicated by the obtained machine ID ("VSERVER00002"), as indicated in FIG. 17. In the example of FIG. 17, in an entry of the machine ID ("VSERVER00002"), an image ID ("IMG00002"), a machine type, a connection destination network NW="NET00002", and a volume="VDISK00001" are stored. In the machine type, a CPU=1, a memory capacity=5 megabites [MB], and a disk capacity=5 gigabites [GB] are stored.

Next, the obtaining unit 24 uses an API correspondence table 28 and generates a request 97 for obtaining information ("VM image explanation") which indicates a content of a virtual machine image used by the provider A as the basic IaaS management target, as indicated in FIG. 18A. The obtaining unit 24 transmits the generated request 97. The provider A, when it receives the request 97, uses the standard API and generates a response 98 which includes "a VM image explanation" of the virtual machine image used by the provider A, as indicated in FIG. 18B. The provider A transmits a response 98 to the migration support device 21. The obtaining unit 24 obtains the response 98 which was transmitted from the provider A. In the case of FIG. 18B, the explanation text of the virtual machine image indicated by the image ID ("IMG00001") is "CentOS 5.6 Tomcat 6.0". The explanation text of the virtual machine image indicated by the image ID ("IMG00002") is "CentOS 5.6 MySQL 5.5". The obtaining unit 24 stores in the configuration information table 29a the "VM image explanation" of the virtual machine image used by the provider A, as indicated in FIG. 19. In the example of FIG. 19, in an entry of the machine ID ("VSERVER00001"), a VM image explanation (CentOS 5.6 Tomcat 6.0) is stored. In an entry of the machine ID ("VSERVER00002"), a VM image explanation (CentOS 5.6 MySQL 5.5) is stored.

Next, the obtaining unit 24 uses an API correspondence table 28 and generates a request for obtaining information on a network used by the provider A as the basic IaaS management target. The obtaining unit 24 transmits the generated request. The provider A, when it receives the request, uses the standard API and generates a response which includes information on the network used by the provider A. The provider A transmits the response to the migration support device 21. The obtaining unit 24 obtains the response which was transmitted from the provider A and stores it in the configuration information table 29a. In the case of FIG. 20, with regard to the network information, in an entry of the network ID ("NET00001"), a network (NW) type="public" and routing information="NET00002" are stored. In an entry of the network ID ("NET00002"), an NW type="private" and routing information="NET00001" are stored.

Next, the obtaining unit 24 uses an API correspondence table 28 and generates a request for obtaining information on a volume used by the provider A as the basic IaaS management target. The obtaining unit 24 transmits the generated request. The provider A, when it receives the request, uses the standard API and generates a response which includes information on the volume used by the provider A. The provider A transmits the response to the migration support device 21. The obtaining unit 24 obtains the response which was transmitted from the provider A and stores it in the configuration information table 29a. In the case of FIG. 21, with regard to the network information, in an entry of the volume ID ("VDISK00001"), a size=100 [GB] is stored.

Next, the obtaining unit 24 uses an API correspondence table 28 and generates a request 101 for obtaining configuration information of the extended IaaS management target from the provider B, as indicated in FIG. 22A. The obtaining unit 24 transmits the generated request 101. The provider B, when it receives the request 101, uses the standard API and generates a response 102 which includes the configuration information of the extended IaaS management target, as indicated in FIG. 22B. The provider B transmits the response 102 to the migration support device 21. The obtaining unit 24 obtains the response 102 which was transmitted from the provider B. In the case of FIG. 22B, the extended IaaS management target is a part which is indicated in boldface, and includes components of two networks indicated as "n5071" and "n5072", two virtual servers indicated as "i2746" and "i2747", and one volume indicated as "v5272". In this case, the configuration information of the extended IaaS management target corresponds to information which indicates each component of two networks indicated as "n5071" and "n5072", two virtual servers indicated as "i2746" and "i2747", and a volume indicated as "v5272".

The obtaining unit 24 stores in the configuration information table 29*b* the configuration information of the obtained extended IaaS management target, as indicated in FIG. 23. In the example of FIG. 23, machine IDs ("i2746", "i2747"), network IDs ("n5071", "n5072"), and a volume ID ("v5272") are stored.

Next, the obtaining unit 24 uses an API correspondence table 28 and generates a request 103 for obtaining the configuration information of the virtual machine indicated by a machine ID ("i2746") as the basic IaaS management target, as indicated in FIG. 24A. The obtaining unit 24 transmits the generated request 103. The provider B, when it receives the request 103, uses the standard API and generates a response 104 which includes the configuration information on the machine ID ("i2746"), as indicated in FIG. 24B. The provider B transmits the response 104 to the migration support device 21. The obtaining unit 24 obtains the response 104 which was transmitted from the provider B. In the case of FIG. 24B, the configuration information of the basic IaaS management target (which is a virtual machine here) indicated by the machine ID ("i2746") is a part which is indicated in a boldface (the number of CPUs, a memory capacity, a disk capacity, a virtual machine image, and a connection destination network). The obtaining unit 24 stores in the configuration information table 29b the configuration information of the virtual machine indicated by the obtained machine ID ("i2746"), as indicated in FIG. 25. In the example of FIG. 25, in an entry of the machine ID ("i2746"), an image ID ("ami3627"), a machine type, and a connection destination NW="n5071" are stored. In the machine type, a CPU=1, a memory capacity=6 [MB], and a disk capacity=6 [GB] are stored.

Next, the obtaining unit 24 uses an API correspondence table 28 and generates a request for obtaining the configuration information of the virtual machine indicated by a machine ID ("i2747") as the basic IaaS management target, similarly to the above. The obtaining unit 24 transmits the generated request. The provider B, when it receives the request, uses the standard API and generates a response which includes the configuration information on the machine ID ("i2747"). The provider B transmits the response to the migration support device 21. The obtaining unit 24 obtains the response which was transmitted from the provider B. The obtaining unit 24 stores in the configuration information table 29b the configuration information of the virtual machine indicated by the obtained machine ID ("i2747"), as indicated in FIG. 26. In the example of FIG. 26, in an entry of the machine ID ("i2747"), an image ID ("ami3628"), a machine type, a connection destination NW="n5072", and a volume="v5272" are stored. In the machine type, a CPU=1, a memory capacity=6 [MB], and a disk capacity=6 [GB] are stored.

Next, the obtaining unit 24 uses an API correspondence table 28 and generates a request for obtaining information ("VM image explanation") which indicates a content of a virtual machine image used by the provider B as the basic IaaS management target. The obtaining unit 24 transmits the generated request. The provider B, when it receives the request, uses the standard API and generates a response which includes "a VM image explanation" of the virtual machine image used by the provider B. The provider B transmits a response to the migration support device 21. The obtaining unit 24 obtains the response which was transmitted from the provider B. The obtaining unit 24 stores in the configuration information table 29b the "VM image explanation" of the virtual machine image used by the provider B, as indicated in FIG. 27. In the example of FIG. 27, in an entry of the machine ID ("i2746"), the image explanation ("CentOS 5.6 Tomcat 6.0") is stored. In an entry of the machine ID ("i2747"), the image explanation ("CentOS 5.6 MySQL 5.5") is stored.

Next, the obtaining unit 24 uses an API correspondence table 28 and generates a request for obtaining information on a network used by the provider B as the basic IaaS management target. The obtaining unit 24 transmits the generated request. The provider B, when it receives the request, uses the standard API and generates a response which includes information on the network used by the provider B. The provider B transmits the response to the migration support device 21. The obtaining unit 24 obtains the response which was transmitted from the provider B and stores it in the configuration information table 29b. In the example of FIG. 28, with regard to the network information, in an entry of the network ID ("n5071"), an NW type="private" and routing information="n5072" are stored. In an entry of the network ID ("n5072"), an NW type="public" and routing information="n5071" are stored.

Next, the obtaining unit 24 uses an API correspondence table 28 and generates a request for obtaining information on a volume used by the provider B as the basic IaaS management target. The obtaining unit 24 transmits the generated request. The provider B, when it receives the request, uses the standard API and generates a response which includes information on the volume used by the provider B. The provider B transmits the response to the migration support device 21. The obtaining unit 24 obtains the response which was transmitted from the provider B and stores it in the configuration information table 29b. In the example of FIG. 29, with regard to the network information, in an entry of the volume ID ("v5272"), a size=100 [GB] is stored.

The obtaining unit 24 repeats processing of S2 to S4 by the number of templates 11 of the extended IaaS management target (S5).

Next, the preparation unit 25 selects a configuration information table 29 from the configuration information table of the migration source and the configuration information of a comparison object (the migration destination candidate) (S6). In the present embodiment, the preparation unit 25 is defined to select the configuration information table 29a of the provider A and the configuration information table 20b of the provider B.

The preparation unit 25 uses the configuration information table 29*a* of the provider A and the configuration information table 20b of the provider B, and prepares a network correspondence relationship table 30 (S7). With regard to processing of S7, detailed explanations will be given using FIG. 9.

The preparation unit 25 prepares from each configuration information table 29 a list 111 (FIG. 30A and FIG. 30B) of a virtual machine which is connected for each network (S7-1). Specifically, with regard to the provider A, the preparation unit 25 obtains from the network information of the configuration information table 29a a "network ID" and an "NW type". With regard to a "connection destination NW", the preparation unit 25 extracts an entry which includes a network that matches up with the obtained "network ID". The preparation unit 25 obtains a "machine ID" and a "VM image explanation" from the extracted entry. In addition, the preparation unit 25 measures the number of extracted entries. The preparation unit 25 stores the obtained "network ID", "NW type", "machine ID", "VM image explanation", and "the number of entries" in the "network ID", "network attribute", "machine ID", "VM image explanation", and "the number of VMs" of a list 110$a$. Then, the list 111$a$ is prepared from the configuration information table 29a.

The preparation unit 25 prepares the list 111$b$ from the configuration information table 29b, similarly to the above.

Next, as indicated in FIG. 30A and FIG. 30B, the preparation unit 25 compares in the lists 111$a$ and 111$b$ "the number of VMs" and the "VM image explanation" in the network of the same attribute (S7-2), and determines whether or not there is a network of which "the number of VMs" and the "VM image explanation" match up (S7-3).

Specifically, the preparation unit 25 searches for an entry which has a network attribute that matches up with the "network attribute" of the entry indicated by the network ID="VNET00001" of the list 111$a$ from the list 111$b$, and the entry indicated by the network ID="n5071" is hit. Since "the number of VMs" and the "VM image explanation" of the entry indicated by the network ID="VNET00001" and of the entry indicated by the network ID="n5071" match up, the preparation unit 25 determines that there is a matched network.

The preparation unit 25, when it determines that there is a matched network ("Yes" in S7-3), stores a determination result in the network correspondence relationship table 30, as indicated in FIG. 31 (S7-4). In the network of the migration source provider, "VNET00001" is stored, and in the corresponding network of the migration destination candidate provider, "n5071" is stored.

As a result of a comparison in S7-2, when there is no network having the same attribute or when "the number of VMs" and the "VM image explanation" do not match up in the same network ("No" in S7-3), the preparation unit 25 determines that the network correspondence relationship table 30 is not prepared (S7-9).

Next, the preparation unit 25 selects a network through which a matched network passes (S76). Specifically, the preparation unit 25, in the network information of the configuration information table 29a, obtains routing information="VNET00002" included in the entry of network ID="VNET00001". In addition, the preparation unit 25, in the network information of the configuration information table 29b, obtains routing information="n5072" included in the entry of network ID="n5071". In this case, since there is a network through which the matched network passes ("Yes" in S7-6, and "Yes" in S7-7), the preparation unit 25 performs the following processing. That is, the preparation unit 25 performs processing of S7-2 for the entry indicated by the network ID="VNET00001" and for the entry indicated by the network ID="n5072".

When there is no network which is routed to the matched network ("No" in S7-6), the preparation unit 25 determines that the network correspondence relationship table 30 is not prepared (S7-9).

The preparation unit 25 repeats processing of S7-2 to S7-6 by the number of networks (S7-7) and prepares the network correspondence relationship table 30.

In S7 of FIG. 8, when the network correspondence relationship table 30 was not prepared ("No" in S8), the preparation unit 25 determines that the basic IaaS management target is not migratable (S12).

In S7 of FIG. 8, when the network correspondence relationship table 30 was prepared, the VM comparison unit 26 compares the virtual machines connected to a corresponding network in the network correspondence relationship table 30 (S9). Detailed explanations will be given for the processing of S9, by using FIG. 10 and FIG. 11.

First, the VM comparison unit 26 obtains a pair of corresponding networks from the network correspondence relationship table 30 (S9-1). The VM comparison unit 26 obtains a virtual machine (migration source VM) which corresponds to "the network of the migration source provider" with regard to the obtained pair and a virtual machine (migration destination candidate VM) which corresponds to "the network of the migration destination candidate provider" (S9-2).

The VM comparison unit 26 uses each configuration information table 29 and compares one migration source VM with one migration destination candidate VM (S9-3). Explanations will be given for the processing of S9-3, by using FIG. 11.

The VM comparison unit 26 determines whether or not the "VM image explanation" of the migration source VM of the configuration information table 29a and the "VM image explanation" of the migration destination candidate VM of the configuration information table 29b are the same (S9-3-1).

When the "VM image explanation" of the migration source VM and the "VM image explanation" of the migration destination candidate VM are different ("No" in S9-3-1), the VM comparison unit 26 determines that the migration source VM does not correspond to the migration destination candidate VM (S9-3-5).

When the "VM image explanation" of the migration source VM and the "VM image explanation" of the migration destination candidate VM are the same ("Yes" in S9-3-1), the VM comparison unit 26 performs the following processing. That is, the VM comparison unit 26 uses the configuration information tables 29a and 29b and determines whether or not the machine type of the migration source VM and the machine type of the migration destination candidate VM are the same, or whether or not the performance of the migration destination candidate VM exceeds the performance of the migration source VM (S9-3-2). Here, when the migration destination candidate VM has a larger number of CPUs, a larger memory size, a larger disk size, and the like than the migration source VM does, the VM comparison unit 26 determines that the performance of the migration destination candidate VM exceeds the performance of the migration source VM.

When the machine type of the migration source VM and the machine type of the migration destination candidate VM differ, or when the performance of the migration destination candidate VM is lower than the performance of the migration source VM ("No" in S9-3-2), the VM comparison unit 26 determines that the migration source VM does not correspond to the migration destination candidate VM (S9-3-5).

When the machine type of the migration source VM and the machine type of the migration destination candidate VM are the same, or when the performance of the migration destination candidate VM exceeds the performance of the migration source VM ("Yes" in S9-3-2), the VM comparison unit 26 performs the following processing. That is, the VM comparison unit 26 determines whether the number of volumes of the migration destination candidate VM is not less than the number of volumes of the migration source VM and whether the capacity of the migration destination candidate VM is not less than the capacity of the migration source VM (S9-3-3). When the number of volumes of the migration destination candidate VM is less than the number of volumes of the migration source VM, or when the capacity of the migration destination candidate VM is less than the capacity of the migration source VM ("No" in S9-3-3), the VM comparison unit 26 determines that the migration source VM does not correspond to the migration destination candidate VM (S9-3-5).

When the number of volumes of the migration destination candidate VM is not less than the number of volumes of the migration source VM ("Yes" in S9-3-3), the VM comparison unit 26 determines that the migration destination candidate VM and the migration source VM correspond with each other (S9-3-4).

The VM comparison unit 26 performs comparison processing of S9-3 for all the combinations of the migration source VM and the migration destination candidate VM which were obtained in S9-2 (S9-4). The VM comparison unit 26 performs processing of S9-1 to S9-4 for all sets of networks that are stored in a network correspondence relationship table 30 (S9-5).

The VM comparison unit 26, as a result of processing of S9, determines whether or not virtual machines match up for all the networks of the providers to be compared (S10). As a result of processing of S9, when virtual machines match up for all the networks of the providers to be compared ("Yes" in S10), the VM comparison unit 26 determines that the extended IaaS management target from the migration source provider to the migration destination candidate provider is migratable (S11). When it is determined that the extended IaaS management target from the migration source provider to the migration destination candidate provider is migratable, the output unit 27 outputs a determination result to a display screen, as indicated by FIG. 32 (S13).

As a result of processing of S9, when the virtual machines do not match up for all the networks of the providers to be compared ("No" in S10), the VM comparison unit 26 determines that the extended IaaS management target from the migration source provider to the migration destination candidate provider is not migratable (S12). When it is determined that the extended IaaS management target is not migratable from the migration source provider to the migration destination candidate provider, the output unit 27 outputs this to the display screen (S13).

When the configuration information of the extended IaaS management target of the provider A indicated in FIG. 12B and the configuration information of the extended IaaS management target of the provider B indicated in FIG. 22B are compared, the respective configurations may not be matched up since the notational system differs. However, by using the present embodiment, the configuration information of the extended IaaS management target of each provider may be matched up by comparing the basic IaaS management target which corresponds to each piece of the configuration information of the extended IaaS management target of each provider.

Figure 32:
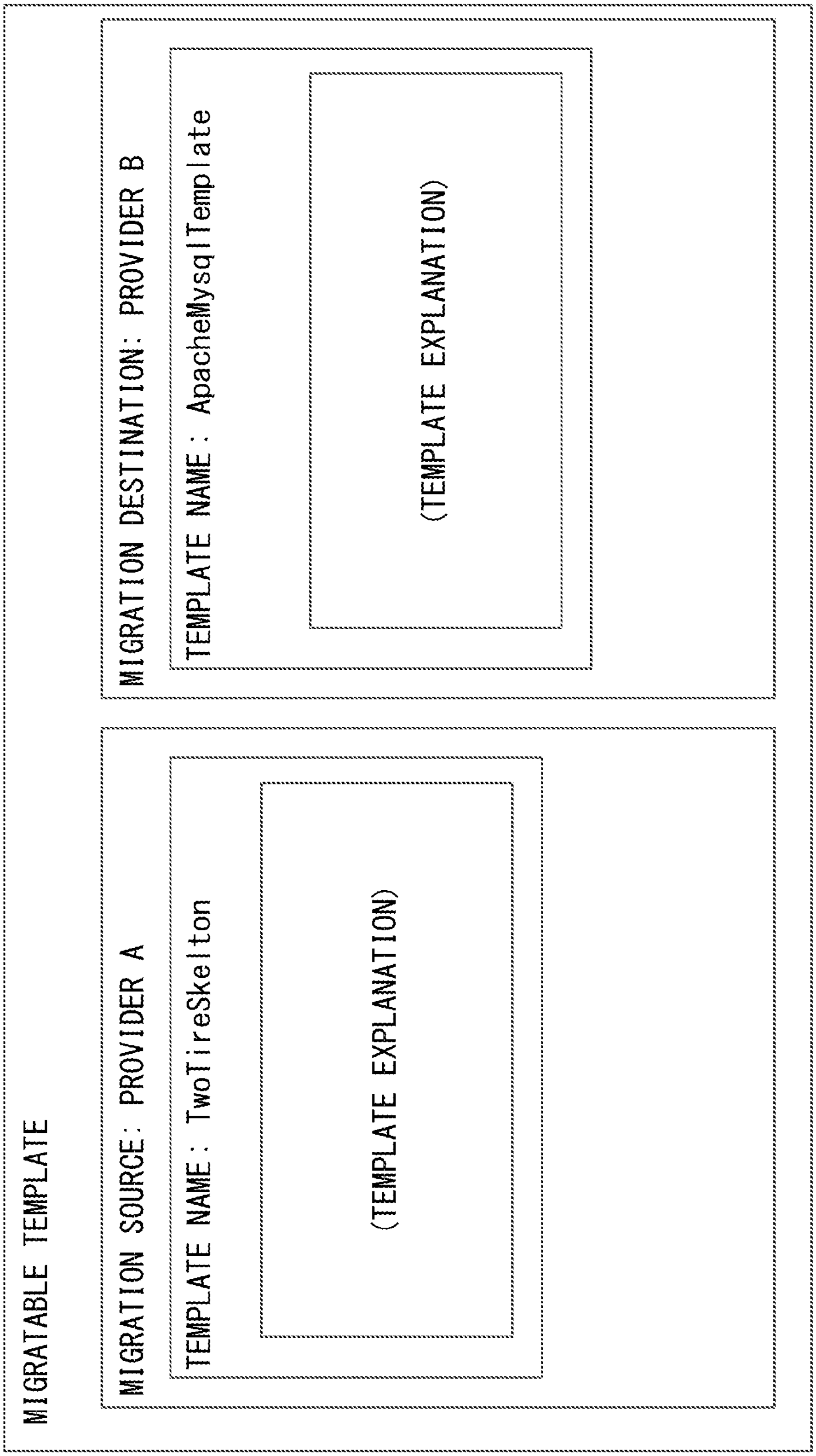
FIG. 32 illustrates one example of an output result in the present embodiment.

FIG. 32 illustrates one example of a screen display which is displayed when the basic IaaS management target from the migration source provider to the migration destination candidate provider is migratable in the present embodiment. An output content includes a content of a template used by the migration source provider and a content of a template used by the migration destination candidate provider, as a migratable template.

Figure 33:
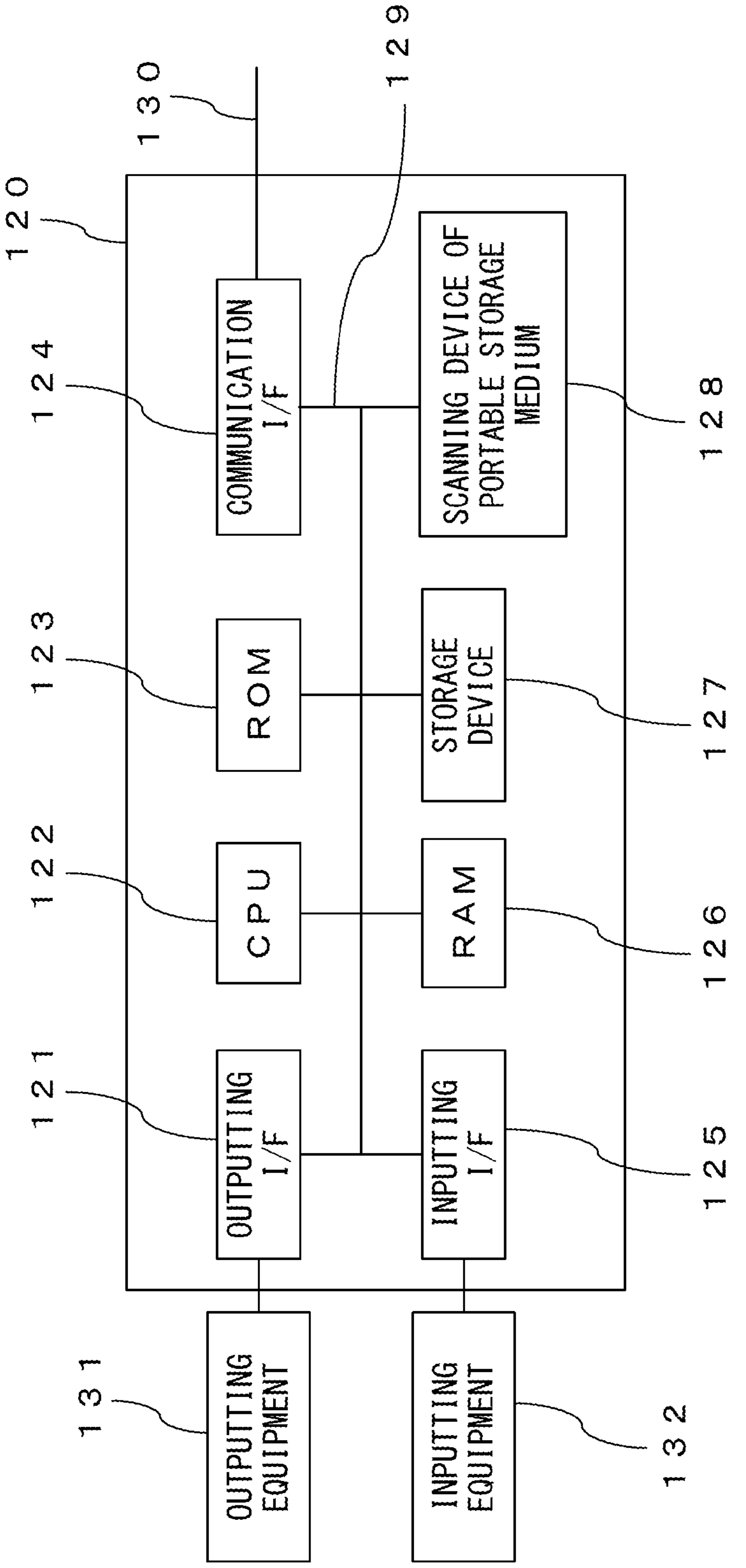
FIG. 33 illustrates a hardware block diagram of a computer for executing migration determination processing in the present embodiment.

FIG. 33 illustrates a hardware block diagram of a computer for executing migration determination processing in the present embodiment. A computer 120 functions as a migration support device 21 by reading the program which performs processing of the embodiment.

A computer 120 includes an output I/F 121, a CPU 122, a ROM 123, a communication I/F 124, an input I/F 125, a RAM 126, a storage device 127, a scanning device 128, and a bus 129. The computer 120 may be connected to a piece of output equipment 131 and an input equipment 132.

Here, a CPU indicates a central processing unit. A ROM indicates a read-only memory. A RAM indicates a random access memory. An I/F indicates an interface. In a bus 129, an output I/F 121, a CPU 122, a ROM 123, a communication I/F 124, an input I/F 125, a RAM 126, a storage device 127, and a scanning device 128 are connected. The scanning device 128 is a device which reads a portable recording medium. The output equipment 131 is connected to the output I/F 121. The input equipment 143 is connected to the input I/F 125.

As a storage device 127, various types of storage devices such as a hard disk drive, a flash memory device, a magnetic disk device, and the like, may be used.

In a storage device 127 or a ROM 123, a migration determination program, an API correspondence table 28, a configuration information table 29, a network correspondence relationship table 30, a list 111, and the like, according to the present embodiment are stored.

A CPU 122 is one example of the processor, and it reads the migration determination program according to the embodiment which is stored in the storage device 127, and the like, executes the program, and functions as the disposing unit 23, the obtaining unit 24, the preparation unit 25, the VM comparison unit 26, and the outputting unit 27.

The migration determination program according to the embodiment may be stored, for example, in a storage device 127 from a side of a program provider through a communication network 130 and a communication I/F 124. The program which realizes processing as explained in the present embodiment may be stored in a portable storage medium which is commercially available and distributed. In this case, the portable storage medium may be set in a scanning device 128, and the program of the portable storage medium may be read out by a CPU 122 and executed. As the portable storage medium, various types of storage media such as a CD-ROM, a flexible disk, an optical disk, a magnetic optical disk, an IC (integrated circuit) card, a USB (Universal Serial Bus) memory device, and the like, may be used. The program stored in such a storage medium is scanned by a scanning device 128.

In addition, a keyboard, a mouse, a digital camera, a web camera, a microphone, a scanner, a sensor, a tablet, a touch panel, and the like may be used for input equipment 132. Further, a display, a printer, a speaker, and the like may be used for output equipment 131. A network 130 may be a communication network such as the Internet, LAN, WAN, an exclusive line, a wired network, a wireless network, and the like.

According to one aspect of the present invention, a migration of an operation environment for a virtual machine may be supported between physical servers.

The present embodiment is not limited to the embodiment mentioned so far above and various configurations or embodiments may be taken within the range of not departing from the gist of the present embodiment.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An operation environment migration support device for supporting a migration of an operation environment, the operation environment migration support device comprising:

a memory; and a processor configured to execute a process including:

obtaining, from each of a first physical server device and a second physical server device each of which is used for providing a virtual system, element information on each of elements of a virtual resource which constructs an operation environment for the virtual system, the elements of the virtual resource including a virtual machine used by the virtual system, a storage area assigned to the virtual machine and a communication network to which the virtual machine belongs;

obtaining, from each of the first physical server device and the second physical server device, subdivided element information for the virtual system, the subdivided element information being information on each of subdivided elements indicative of each of elements which constructs each of the elements indicated by the element information;

on the basis of the subdivided element information for the virtual system, determining whether or not a type of the communication network and information on the virtual machine which belongs to the communication network match up respectively;

when it is determined that types of the communication network and information on the virtual machine which belongs to the communication network match up respectively, determining whether or not each of performances of each of the subdivided elements indicated by the subdivided element information obtained from the second physical server device exceeds each of performances of each of the subdivided elements indicated by the subdivided element information obtained from the first physical server device; and when it is determined that each of the performances of each of the subdivided elements indicated by the subdivided element information obtained from the second physical server device exceeds each of the performances of each of the subdivided elements indicated by the subdivided element information obtained from the first physical server device, outputting information which indicates that an operation environment for all of the virtual system provided by using the first physical server device is migratable to an operation environment for all of the virtual system provided by using the second physical server device.

2. The operation environment migration support device according to claim 1, wherein, in the determination of whether or not the type of the communication network and information on the virtual machine which belongs to the communication network match up, when an attribute of the communication network, routing information of the communication network, and information on a file system of the virtual machine which belongs to the communication network that are included in subdivided element information match up, communication network identification information for identifying a communication network obtained from each of the first and second physical server devices is related.

3. The operation environment migration support device according to claim 2, wherein in the determination of whether or not each of the performances of each of the subdivided elements indicated by the subdivided element information obtained from the second physical server device exceeds each of the performances of each of the subdivided elements indicated by the subdivided element information obtained from the first physical server device, on the basis of the subdivided element information, a type of the file system of the virtual machine which belongs to the communication network corresponding to each of the pieces of the related communication network identification information is compared with resource information which is assigned to the virtual machine, and as a result of a comparison, a determination is made whether or not each of performances of each of subdivided elements indicated by subdivided element information obtained from the second physical server device exceeds each of performances of each of subdivided elements indicated by subdivided element information obtained from the first physical server device.

4. A non-transitory computer readable storage medium having stored therein a program for causing a computer to execute operation environment migration support processing comprising:

obtaining, from each of a first physical server device and a second physical server device each of which is used for providing a virtual system, element information on each of elements of a virtual resource which constructs an operation environment for the virtual system, the elements of the virtual resource including a virtual machine used by the virtual system, a storage area assigned to the virtual machine and a communication network to which the virtual machine belongs;

obtaining, from each of the first physical server device and the second physical server device, subdivided element information for the virtual system, the subdivided element information being information on each of subdivided elements indicative of each of elements which constructs each of the elements indicated by the element information;

on the basis of the subdivided element information for the virtual system, determining whether or not a type of the communication network and information on the virtual machine which belongs to the communication network match up respectively;

when it is determined that types of the communication network and information on the virtual machine which belongs to the communication network match up respectively, determining whether or not each of performances of each of the subdivided elements indicated by the subdivided element information obtained from the second physical server device exceeds each of performances of each of the subdivided elements indicated by the subdivided element information obtained from the first physical server device; and when it is determined that each of the performances of each of the subdivided elements indicated by the subdivided element information obtained from the second physical server device exceeds each of the performances of each of the subdivided elements indicated by the subdivided element information obtained from the first physical server device, outputting information which indicates that an operation environment for all of the virtual system provided by using the first physical server device is migratable to an operation environment for all of the virtual system provided by using the second physical server device.

5. The non-transitory computer readable storage medium according to claim 4, wherein in a determination of whether or not the type of the communication network and information on the virtual machine which belongs to the communication network match up, when an attribute of the communication network, routing information of the communication network, and information on a file system of the virtual machine which belongs to the communication network that are included in subdivided element information match up, communication network identification information for identifying a communication network obtained from each of the first and second physical server devices is related.

6. The non-transitory computer readable storage medium according to claim 5, wherein in the determination of whether or not each of the performances of each of the subdivided elements indicated by the subdivided element information obtained from the second physical server device exceeds each of the performances of each of the subdivided elements indicated by the subdivided element information obtained from the first physical server device, on the basis of the subdivided element information, a type of the file system of the virtual machine which belongs to the communication network corresponding to each piece of the related communication network identification information is compared with resource information which is assigned to the virtual machine, and as a result of a comparison, a determination is made whether or not each of performances of each of subdivided elements indicated by subdivided element information obtained from the second physical server device exceeds each of performances of each of subdivided elements indicated by subdivided element information obtained from the first physical server device.

7. A method for supporting a migration of an operation environment, the method comprising:

obtaining, from each of a first physical server device and a second physical server device each of which is used for providing a virtual system, element information on each of elements of a virtual resource which constructs an operation environment for the virtual system by using a computer, the elements of the virtual resource including a virtual machine used by the virtual system, a storage area assigned to the virtual machine and a communication network to which the virtual machine belongs;

obtaining, from each of the first physical server device and the second physical server device, subdivided element information for the virtual system by using the computer, the subdivided element information being information on each of subdivided elements indicative of each of elements which constructs each of the elements indicated by the element information;

on the basis of the subdivided element information for the virtual system, determining whether or not a type of the communication network and information on the virtual machine which belongs to the communication network match up respectively by using the computer;

when it is determined that types of the communication network and information on the virtual machine which belongs to the communication network match up respectively, determining whether or not each of performances of each of the subdivided elements indicated by the subdivided element information obtained from the second physical server device exceeds each of performances of each of the subdivided elements indicated by the subdivided element information obtained from the first physical server device by using the computer; and when it is determined that each of the performances of each of the subdivided elements indicated by the subdivided element information obtained from the second physical server device exceeds each of the performances of each of the subdivided elements indicated by the subdivided element information obtained from the first physical server device, outputting information which indicates that an operation environment for all of the virtual system provided by using the first physical server device is migratable to an operation environment for all of the virtual system provided by using the second physical server device by using the computer.

* * * * *